United States Patent
Kang

(10) Patent No.: US 9,241,332 B2
(45) Date of Patent: Jan. 19, 2016

(54) SYSTEM AND METHOD FOR MANAGING RESOURCES IN A COMMUNICATION SYSTEM

(75) Inventor: Hyunduk Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 322 days.

(21) Appl. No.: 13/820,611

(22) PCT Filed: Sep. 2, 2011

(86) PCT No.: PCT/KR2011/006524
§ 371 (c)(1),
(2), (4) Date: Mar. 4, 2013

(87) PCT Pub. No.: WO2012/030190
PCT Pub. Date: Mar. 8, 2012

(65) Prior Publication Data
US 2013/0165170 A1    Jun. 27, 2013

(30) Foreign Application Priority Data

| Sep. 3, 2010 | (KR) | 10-2010-0086375 |
| Sep. 6, 2010 | (KR) | 10-2010-0086950 |
| Sep. 1, 2011 | (KR) | 10-2011-0088665 |
| Sep. 1, 2011 | (KR) | 10-2011-0088742 |

(51) Int. Cl.
*H04B 7/00* (2006.01)
*H04W 72/04* (2009.01)
*H04W 16/14* (2009.01)

(52) U.S. Cl.
CPC .......... *H04W 72/0453* (2013.01); *H04W 16/14* (2013.01)

(58) Field of Classification Search
CPC . H04W 16/14; H04W 16/18; H04W 72/0453; H04W 72/00; H04W 72/044; H04W 72/04
USPC ............... 455/509, 450, 500, 517, 550, 445, 455/426.1, 426.2, 403, 422.1, 507, 51, 4, 455/515, 560, 414.1–14.434, 3.01–3.06, 455/518, 519; 370/310, 328, 329, 343, 338; 725/62–72
See application file for complete search history.

(56) References Cited

U.S. PATENT DOCUMENTS

2011/0286401 A1 * 11/2011 Wijting et al. ................ 370/329

FOREIGN PATENT DOCUMENTS

| KR | 10-2008-0010907 A | 1/2008 |
| KR | 10-2008-0076262 A | 8/2008 |

(Continued)

OTHER PUBLICATIONS

Ha Nguyen Tran et al., "P802.19.1 System Architecture",, IEEE 802.19-10/46r3, Mar. 17, 2010.
Hyunduk Kang et al., "19-10-0113-00-0001-system-description-and-reference-model-proposal",IEEE P802.19, Sep. 2010.
Hyunduk Kang et al., "19-10-0113-01-0001-system-description-and-reference-model-proposal",IEEE P802.19, Sep. 2010.

(Continued)

*Primary Examiner* — Keith Ferguson
(74) *Attorney, Agent, or Firm* — William Park & Associates Ltd.

(57) ABSTRACT

The present invention relates to a system and method for managing resources, which involve managing a plurality of frequency resources in a communication system including a plurality of systems having no right to use a first frequency band. The system comprises a coexistence manager (CM) which manages, when a frequency band usable by the plurality of systems is found in the first frequency band, the plurality of systems so as to enable the coexistence of the systems and frequency-sharing among the systems in the usable frequency band; a coexistence enabler (CE) which transceives information of the plurality of systems and information of the coexistence manager; and a coexistence discovery and information server which supports the control of the coexistence manager on the plurality of systems. The plurality of systems uses the usable frequency band by means of coexistence and frequency-sharing according to a reference model.

20 Claims, 16 Drawing Sheets

(56) References Cited

FOREIGN PATENT DOCUMENTS

| KR | 10-2010-0041235 A | 4/2010 |
| WO | 2010-044580 A2 | 4/2010 |

OTHER PUBLICATIONS

Hyunduk Kang et al., "19-10-0113-02-0001-system-description-and-reference-model-proposal", IEEE P802.19, Sep. 2010.

* cited by examiner

SYSTEM AND METHOD FOR MANAGING RESOURCES IN A COMMUNICATION SYSTEM

CROSS-REFERENCES TO RELATED APPLICATIONS

The present application claims priority of Korean Patent Application Nos. 10-2010-0086375, 10-2010-0086950, 10-2011-0088742, and 10-2011-0088665, filed on Sep. 3, 2010, Sep. 6, 2010, Sep. 1, 2011, and Sep. 1, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in a communication system.

2. Description of Related Art

In a current communication system, research for providing services having various quality of services (hereinafter, referred to as 'QoS') to users at a high transmission rate has been actively conducted. In the communication system, research for providing large-capacity services having various QoS using limited resources, for example, frequency resources has been actively conducted. In particular, due to a development of radio communication technologies and an introduction of wireless communication services, there is a need to more efficiently use limited frequency resources.

As a method for increasing use efficiency of limited frequency resources in the communication system, there are provided methods for maximizing spectral efficiency by optimizing performance of a communication system, for example, multiple access, encoding, modulation, information compression, or the like, and minimizing interference with another type of communication system. In addition, there is provided a frequency sharing method for increasing use efficiency of frequency resources by using an available frequency band among frequency bands that are being used in advance such as a TV band.

Here, the frequency sharing in the available frequency bands among the frequency bands that are being used in advance such as a TV band as described above needs to use a frequency band without providing interference to a primary incumbent having preemptive permission for the TV band. Therefore, it is important to detect the available frequency bands by confirming whether the frequency band of the primary incumbent in the TV band is used. In addition, when there are a plurality of different systems for using the available frequency bands detected in the TV band, there is a problem of coexistence for using the available frequency bands due to a communication type among the plurality of different systems, for example, wireless access schemes, or the like.

In other words, in the current communication system, when there are a plurality of different systems using the available frequency bands detected in the TV band as described above, there is no resource managing method for coexisting the plurality of different systems to efficiently use the detected available frequency bands, in particular, there is no method for coexisting different communication types of systems to efficiently use the available frequency bands so as to efficiently use frequency resources.

Therefore, a need exists for a resource managing method for detecting the available frequency bands among the frequency bands that are being used in advance such as the TV band in the communication system and then, coexisting the plurality of different systems, for example, different communication types of systems so as to efficiently use the detected available frequency bands.

SUMMARY OF THE INVENTION

An embodiment of the present invention is directed to a system and a method for managing resources in a communication system.

Further, an embodiment of the present invention is directed to a system and a method for managing resources in a communication system in which a plurality of systems coexist to effectively use available frequency bands among frequency bands that are being used in advance in the communication system.

In addition, an embodiment of the present invention is directed to a system and a method for managing frequency resources in which a plurality of systems in a communication system coexist according to reference models so as to use an available frequency band in a TV band.

Moreover, an embodiment of the present invention is directed to a system and a method for managing frequency resources in which a plurality of systems in a communication system coexist to send and receive signals according to the coexistence and the frequency sharing of the plurality of systems in the communication system so as to use an available frequency band in a TV band.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems not having permission for a first frequency band includes: a coexistence manager (CM) configured to manage the plurality of systems for providing coexistence and frequency sharing of the plurality of systems in the available frequency bands when the plurality of systems search the available frequency bands in the first frequency band; a coexistence enabler (CE) configured to send and receive information on the plurality of systems and information on the coexistence manager; and a coexistence discovery and information server (CDIS) configured to support a control of the coexistence manager for the plurality of systems, wherein the plurality of systems use the available frequency bands through the coexistence and the frequency sharing according to a reference model.

In accordance with another embodiment of the present invention, a method for managing resources in a first frequency band in a communication system including a plurality of systems not having permission for a first frequency band includes: defining a reference model and an interface in the available frequency band for providing coexistence and frequency sharing of the plurality of systems in the available frequency bands when the plurality of systems search the available frequency bands in the first frequency band; grouping the plurality of interfaces according to a communication scheme and an interface of the plurality of systems; and allocating a first available channel in the available frequency bands as an operating channel of first group systems in the plurality of systems according to the reference model.

DESCRIPTION OF SPECIFIC EMBODIMENTS

Figure 1:
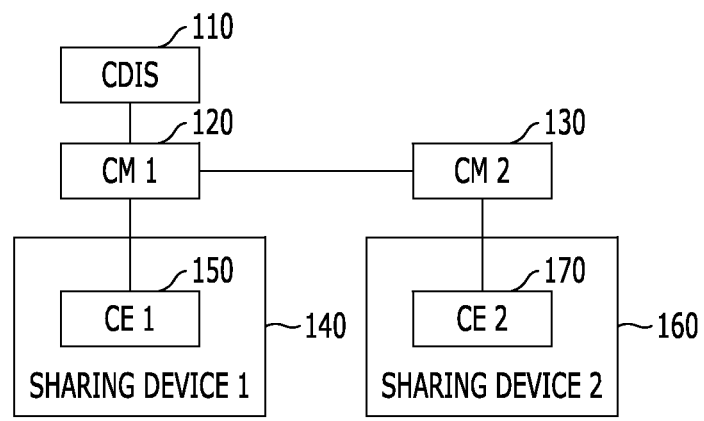
FIG. 1 is a diagram schematically illustrating a structure of a system for managing resources in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Embodiments of the present invention propose a system and a method for managing resources capable of detecting available frequency bands among frequency bands that are being used in advance like a TV band in a communication system, for example, a cognitive radio (Hereinafter, referred to as 'CR') system, IEEE 802.19 based system, or IEEE 802.22 based system and effectively using the detected available frequency bands. Here, although the embodiments of the present invention describe, for example, the CR system and the IEEE 802.19 and the IEEE 802.22 based system, a method for managing resources proposed in the embodiment of the present invention may also be applied to other communication systems.

In addition, the embodiment of the present invention describes a system and a method for managing resources in which the plurality of different systems coexist in a communication system according to the reference models so as to effectively use available frequency bands in a TV band. Here, the embodiments of the present invention each define reference models and interfaces for each object of the system for managing resources for providing the sharing of the available frequency bands in the communication system and provide the coexistence of a plurality of different systems, in particular, systems using different communication schemes, for example, a wireless access scheme according to reference models and interfaces so as to share the available frequency bands among the frequency bands used in advance like a TV band, thereby improving the using efficiency of the frequency resources.

That is, the embodiments of the present invention describe the reference models and interfaces of the system for managing resources for the existence and the frequency sharing among the plurality of different systems in the communication system, thereby improving the using efficiency of the limited frequency resources by sharing the available frequency bands through the reference models and the interfaces.

Further, the embodiments of the present invention describe the system and method for managing resources so as to effectively using the available frequency bands in the TV band by defining the interfaces for the existence and the frequency sharing of the plurality of difference systems in the communication system and providing the coexistence and the frequency sharing of the plurality of systems by the sending and receiving of the signals according to the defined interface. Here, the embodiments of the present invention each define the interfaces among each object of the system for managing resources so as to provide the sharing of the available frequency band in the communication system and provide the coexistence of a plurality of different systems, in particular, the systems using different communication schemes, for example, a wireless access scheme by allowing each object of the system for managing resources to send and receive signals according to the defined reference model, thereby sharing the available frequency bands among the frequency bands used in advance like a TV band improving the using efficiency of the frequency resources.

That is, the embodiments of the present invention describe the interfaces of the system for managing resources for the existence and the frequency sharing among the plurality of different systems in the communication system, thereby improving the using efficiency of the limited frequency resources by sharing the available frequency bands through the interface. Here, the embodiments of the present invention shares the frequency in the available frequency bands among the frequency bands used in advance, in particular, need to use the available frequency bands without providing interference to a primary incumbent having preemptive permission for the TV band. To this end, the embodiments of the present invention detects the available frequency band by confirming whether the primary incumbent use the frequency band in the TV band and use the detected available frequency bands through the coexistence and the frequency sharing of the plurality of difference systems wanting to use the available frequency bands detected in the TV band. Hereinafter, a system for managing resources in the communication system in accordance with the embodiments of the present invention will be described in more detail with reference to FIG. 1.

FIG. 1 is a diagram schematically illustrating a structure of a system for managing resources in a communication system in accordance with an exemplary embodiment of the present invention.

Referring to FIG. 1, when the plurality of different systems want to use the available frequency bands among the frequency bands used in advance like the TV band, the system for managing resources includes sharing device using the available frequency bands through the frequency sharing of the plurality of different systems, for example, a sharing device 1 140 and a sharing device 2 160, a coexistence manager (CM) (hereinafter, referred to as 'CM') managing the sharing devices 140 and 160 so as to improve frequency sharing efficiency between the sharing devices 140 and 160, for example, CM1 120 and CM2 130, a coexistence enabler (CE) (hereinafter, referred to as 'CE') serving as a path between the sharing devices 140 and 160 and the CMs 120 and 130, for example, CE1 140 and CE2 170, and a server supporting a control of the sharing devices 140 and 160 of the CMs 120 and 130, for example, a coexistence discover and information server (CDIS) (hereinafter, referred to as 'CDIS').

As described above, the sharing devices 140 and 160 means devices of the plurality of different frequency bands, that is, secondary systems allowing other users (hereinafter, referred to as a 'secondary system') not having preemptive permission for the TV band to detect and use the predetermined frequency bands as the available frequency band in the TV band when the primary incumbent (hereinafter, referred to as a 'primary system') having preemptive permission for the TV band does not use the predetermined frequency band in the TV band, Here, the sharing devices 140 and 160 shares and uses the predetermined frequency bands through the coexistence and the frequency sharing so as to more efficiently use limited frequency resources.

As described above, the CEs 150 and 160 are included in each of the sharing devices 140 and 160 to send and receive the information of the sharing devices 140 and 160 and the information of the CMs 120 and 130. Herein, for convenience of explanation, the embodiments of the present invention mainly describes that the CEs 150 and 160 are included in the sharing devices 140 and 160, but the CEs 150 and 160 may exist as independent objects or may be included in the CMs 120 and 130.

In addition, the CEs 150 and 160 extract context information related to the corresponding sharing devices 140 and 160 requested by each of the CMs 120 and 130, for example, information such as a wireless access scheme, transmission power, a spectrum sensing threshold value, and position, or the like, from the sharing devices and send the extracted context information to the CMs 120 and 130. That is, the CEs 150 and 160 acquire the communication related information of each systems as the context information for different secondary systems and sends the acquired information to the CMs 120 and 130.

Further, the CEs 150 and 160 receives a request of the CMs 120 and 130 for managing the sharing devices 140 and 160, for example, the request of the context information and the configuration of the sharing devices 140 and 160 and updates the context information of the sharing devices and resets and reconfigure of the configuration of the sharing devices 140 and 160, according to the request. In other words, the CEs 150 and 160 receive the changed information of the context information, that is, the event information of the sharing devices 140 and 160 as the request of the context information of the sharing devices 140 and 160 and updates the context information of the sharing devices 140 and 160 according to the event information. In addition, the CEs 150 and 160 receives the resetting of the components of the sharing devices 140 and 160 as the request of the configuration of the sharing devices 140 and 160 and resets, that is, reconfigure the components of the sharing devices 140 and 160 according to the resetting of the components.

The CMs 120 and 130 determines operation frequency allocation, transmission power allocation, transmission time allocation, or the like, so as to improve the frequency sharing efficiency between the sharing devices 140 and 160. In other words, the CMs 120 and 130 perform the operation frequency allocation, the transmission power allocation, and the transmission time allocation of the sharing devices 140 and 160 in the available frequency band so as to improve the frequency sharing efficiency between the sharing devices 140 and 160 for the available frequency band in the above-mentioned TV band.

Here, the CMs 120 and 130 performs the operation frequency allocation, the transmission power allocation, and the transmission time allocation of the corresponding sharing device in the available frequency bands by sending and receiving the information, for example, the context information and the event information of the sharing devices from and to the CMs of the sharing devices that do not correspond to the CMs 120 and 130, so as to more improve the frequency sharing efficiency between the sharing devices 140 and 160. In this case, the CMs 120 and 130 acquire the context information and the event information of the sharing devices that do not correspond to the CMs 120 and 130 by directly sending and receiving to and from other CMs or sending and receiving to and from other CMs through a CDIS 110. Further, the CMs 120 and 130 acquire the information on the use of the spectrum at the primary system through the external database or request the resetting of the components of the sharing devices corresponding to the CMs 120 and 130 to other CMs.

As described above, the CDIS 110 supports the control operation of the CMs 120 and 130 for sharing the frequency of the sharing devices 140 and 160 for the available frequency bands in the TV band. That is, the CDIS 110 receives and stores the context information and the event information of the sharing devices 140 and 160 from the CMs 120 and 130 and sends the context information and the event information to the CMs 120 and 130 according to the request of the CMs 120 and 130. Further, the CDIS 110 acquires and stores the information on the use of the spectrum in the primary system through the external database.

The system for managing resources in the communication system in accordance with the embodiments of the present invention includes the CDIS 110, the CMs 120 and 130, and the CEs 140 and 160 so as to allow the available frequency band used in advance in the primary system like the TV band to share the secondary system, that is, the coexistence and the frequency sharing of the sharing devices 140 and 160. Here, as described above, the sharing devices 140 and 160, which are devices of the secondary systems for sharing the available frequency bands, may be a base station (BS) (hereinafter, referred to as 'BS'), access point (AP) (hereinafter, referred to as 'AP'), a service access point (SAP) (hereinafter, referred to as 'SAP'), a terminal, or the like. In addition, as described above, the secondary systems, which are a plurality of different systems for sharing the available frequency bands, may be the systems using different communication schemes, for example, IEEE 802.19 based system and the IEEE 802.22 based system, or the like.

In addition, the system for managing resources in the communication system in accordance with the embodiment of the present invention defines the reference models to provide the coexistence and the frequency sharing of the sharing devices 140 and 160 for the available frequency bands among the frequency bands used in advance, that is, allow the plurality of different systems using different communication schemes to share the frequency, in particular, defines each reference models for the coexistence and the frequency sharing of different systems for the CDIS 110, the CMs 120 and 130, and the CEs 140 and 160. Further, as described above, the system for managing resources defines the interfaces for each CM 120 and 130 and each CE 140 and 160 so as to provide the coexistence and the frequency sharing of the sharing devices 140 and 160, that is, allow the plurality of systems using different communication schemes to share the frequency. Herein, the reference models and the interfaces for the CDIS 110, the CMs 120 and 130, and the CEs 140 and 160 will be described in more detail below. The operation of allowing the system for managing resources in the communication system in accordance with the embodiment of the present invention to manage the resources for the coexistence and the frequency sharing of the plurality of different systems will be described in more detail with reference to FIG. 2.

Figure 2:
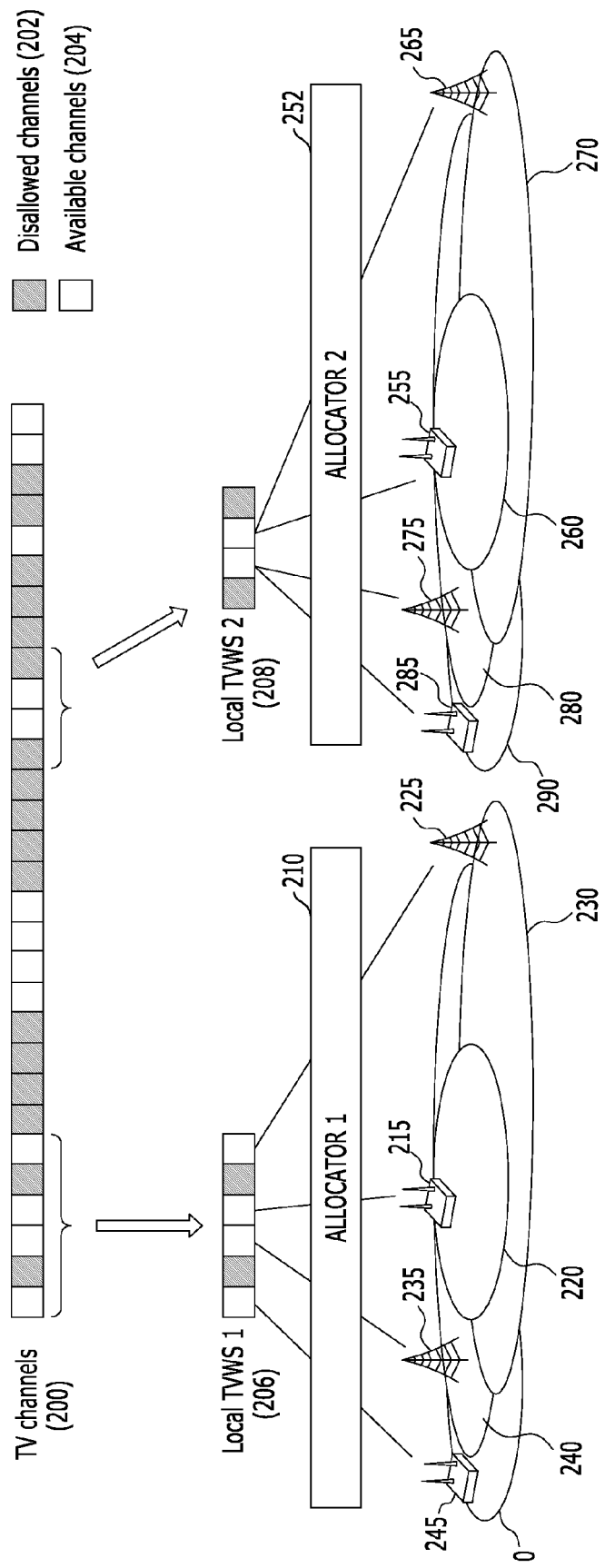
FIG. 2 is a diagram for explaining an operation for managing resources of the system for managing resources in the communication system in accordance with the embodiment of the present invention.

FIG. 2 is a diagram for explaining an operation for managing resources of a system for managing resources in the communication system in accordance with the embodiment of the present invention. As described above, FIG. 2 is a diagram schematically illustrating the system for managing resources allocating the frequency resources for the frequency sharing so as to allow the primary system to use the available frequency bands among the frequency bands used in advance through the coexistence and the frequency sharing of the plurality of different systems, that is, the secondary systems.

Referring to FIG. 2, the system for managing resources detects available channels 204 other than non-available channels, that is, disallowed channels 202 that cannot be used due to the use of the primary system among TV channels 200 that are the frequency band used in advance by the primary system, that is, the TV band and allocates the detected available channels 202, that is, TV white space (TVWS) (hereinafter, referred to as 'TVWS') to the plurality of service regions, respectively. Herein, the system for managing resources allocates the detected available channels 202 through the plurality of systems, that is, the coexistence and the frequency sharing of the sharing devices as described above, when the plurality of systems do not sufficiently have the available channels corresponding to the operating channels that can be dedicatedly used by the plurality of systems using various wireless access schemes.

In this case, the system for managing resources may allocate one of the detected available channels 202 as the operating channel of the single sharing device or allow the plurality of sharing devices to share the single available channel and at the same time, allocate the shared available channel as the operating channel and allocate the operating channel previously allocated to any sharing device as the operation channel of any sharing device. Here, the system for managing resources allocates the single available channel to the operation channel of the single sharing device as described above by an individual channel assignment scheme allowing each sharing device to use the detected available channels 202 as other operating channels according to the reference models or allocates the single available channel as the operating channel of the plurality of sharing devices as described above by a co-channel sharing scheme allowing two or more sharing devices to share the single operating channel in the detected available channels 202 according to the reference models or allocates the channel previously allocated as the operation channel of the sharing device as the operating channel of another sharing device.

Describing in more detail, in the case of the individual channel allocating scheme, the system for managing resources allocates a first local TVWS 206 to the plurality of different systems, that is, the sharing devices 215, 225, 235, and 245 through an allocator 1 210 in the detected available channels 202. In this case, the allocator 1 210 allocates the single operating channel to the sharing devices 215, 225, 235, and 245 in the service regions by the individual channel allocation scheme, that is, the single available channel as the operating channel of the single sharing device in the first local TVWS 206 and is included in the CMs 120 and 130 as illustrated in FIG. 1. That is, the single available channel is allocated to the sharing devices 215, 225, 235, and 246 in the service regions 220, 230, 240, and 250 as the operating channel in the first local TVWS 206.

In addition, in the case of the co-channel sharing scheme, the system for managing resources allocates a second local TVWS 208 to the plurality of different systems, that is, the sharing devices 255, 265, 275, and 285 in each service region 255, 265, 275, and 285, respectively, through an allocator 2 252 in the detected available channels 202. In this case, the allocator 2 252 is allocated to allow the sharing devices 255, 265, 275, and 285 in the service regions 260, 270, 280, and 290 to share the single available channel as the operating channel by the co-channel sharing scheme, that is, allocates the single available channel as the operating channel of the plurality of sharing device in the second local TVWS 208 and is included in the CMs 120 and 130 as illustrated in FIG. 1. That is, the single available channel in the second local TVWS 208 allocates the operating channels of the plurality of sharing devices 255, 265, 275, and 285 in the service regions 260, 270, 280, and 290, that is, is allocated as the sharing frequency band of the plurality of sharing devices.

In particular, the system for managing resources in accordance with the embodiment of the present invention groups the systems using the same communication scheme and then, the same available channel to the grouped systems as the operating channel when the single available channel is allocated as the operating channel of the plurality of systems by the co-channel sharing scheme. In other words, the CEs of the sharing devices using the same communication scheme are grouped, for example, the CEs of the IEEE 802.11 based sharing devices are grouped into a first group and the IEEE 802.22 based sharing devices are grouped into a second group and then, the first available channel is allocated to the first group as the operating channel in the available frequency band and the second available channel is allocated as the operating channel in the available frequency band.

In this case, the system for managing resources in the communication system in accordance with the embodiment of the present invention groups the systems defined by the same interface, that is, the CEs of the sharing devices defined by the same interface for communicating with the sharing devices and then, allocates the same available channel to the grouped sharing devices as the operating channel, when it is difficult to group the plurality of systems as the systems using the same communication scheme. In other words, the first available channel is allocated to the first group of the systems defined by the first interface in the available frequency band and the second available channel is allocated to the second group of the systems defined by the second interface as the operating channel in the available frequency band.

Herein, when the system for managing resources allocates the available channels 202 to the plurality of sharing devices by the co-channel sharing scheme, the plurality of sharing devices using the single available channels as the operating channel are present. In this case, when the plurality of sharing devices use the same wireless access scheme, the problem of the coexistence of the plurality of sharing devices is resolved by a self-coexistence mechanism, but when the plurality of sharing devices uses an inter-system wireless access scheme, the problem of the coexistence thereof is resolved by an inter-system coexistence mechanism, which requires more complicated mechanism than the case of resolving the problem of the coexistence by the self-coexistence mechanism so as to avoid the co-channel interference. The reference model definition operation of allowing the system for managing resources in the communication system in accordance with the embodiment of the present invention to provide the coexistence and the frequency sharing of the plurality of different systems will be described in more detail with reference to FIGS. 3 to 5.

Figure 3:
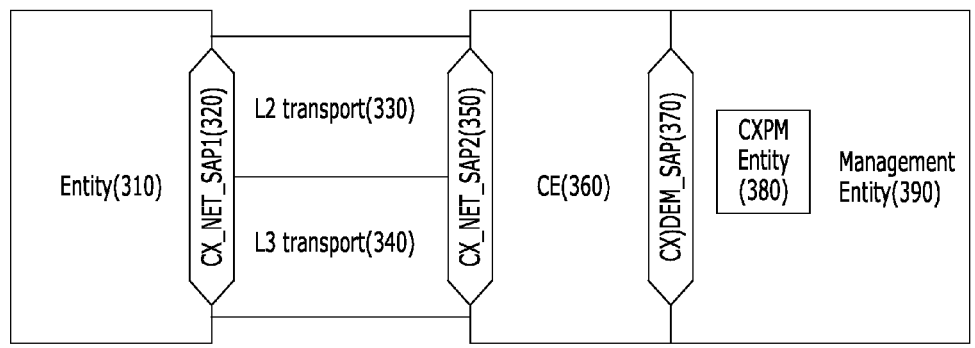
FIGS. 3 to 5 are diagrams for explaining reference models of the system for managing resources in the communication system in accordance with the embodiment of the present invention.
Figure 4:
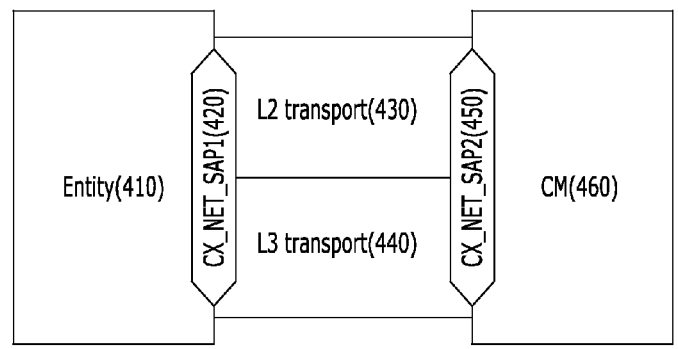
Figure 5:
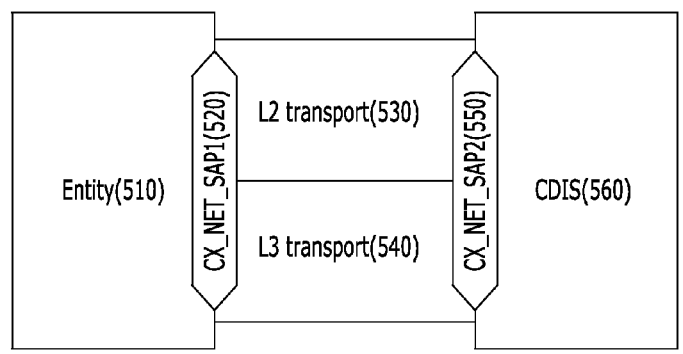

FIGS. 3 to 5 are diagrams for explaining the reference models of the system for managing resources in the communication system in accordance with the embodiment of the present invention. Here, FIG. 3 is a diagram for explaining the CE reference model of the system for managing resources in the communication system in accordance with the embodiment of the present invention, FIG. 4 a diagram for explaining the CM reference model of the system for managing resources, and FIG. 5 a diagram for explaining the CDIS reference model of the system for managing resources.

Referring first to FIG. 3, the CE reference model of the system for managing resources includes an entity 310 that includes remote CM/CDIS entity or entity such as database, or the like, each object of the system for managing resources, that is, a coexistence network SAPs (CX_NET_SAP CoeXistence NETwork SAP) (hereinafter, referred to as 'CX_NET_ SAP'), that is, CX_NET_SAP1 320 and CX_NET_SAP2 350, a L2 transport 330 and a L3 transport 340 between the CX_NET_SAPs 320 and 350, a CE 360, a coexistence device management entity SAP 370 (CX_DME_ SAP CoeXistence Device Management Entity SAP) (hereinafter, referred to as 'CX_DME_SAP') for communicating with different management objects, and a management entity 390 including a coexistence primitive mapping (CXPM CoeXistence Primitive Mapping) (hereinafter, referred to as 'CXPM') as different management objects.

In the CE reference model, the CE 360 is present in an application layer in an open systems interconnection (hereinafter, referred to as 'OSI') structure and therefore, includes one or more SAP, that is, the CX_NET_SAP2 350 and the CX_DME_SAP 370. Here, the SAP is defined by a set of the SAP primitives.

Further, in the CE reference model, the entity 310 including the remote CM/CDIS entity or the entity such as the database, which is an object performing the communication with the CE 360 for the coexistence and the frequency sharing of the plurality of sharing devices as described above, includes the CX_NET_SAP1 320 so as to perform the communication with the CX_NET_SAP2 350 included in the CE 360 through the L2 transport 330 and the L3 transport 340.

Here, the CX_NET_SAPs 320 and 350 are SAPs that are physically spaced apart from each other and performs communication with the objects not included in the same sharing device, for example, the CE, CM, and CDIS corresponding to other sharing devices and are also connected with the entity such as an external data base, or the like, providing the channel information. In this case, the CX_NET_SAPs 320 and 350 perform the communication through the L2 transport 330 and the L3 transport 340. Herein, the L2 transport 330 can perform the communication among the plurality of systems using the same wireless access scheme as the data link layer, that is, the intra-domain communication among the plurality of sharing devices and the L3 transport 340 can perform the communication among the plurality of systems using the inter-system wireless access scheme as the network layer, that is, the inter-domain communication among the plurality of sharing devices.

In other words, the entity 310 including the remote CM/CDIS entity or the entity such as the database, or the like, and the CE 360 perform the communication for the coexistence and the frequency sharing of the sharing devices by using the L2 transport 330 and the L3 transport 340 by the CX_NET_SAPs 320 and 350.

In addition, the CE 360 includes the CX_NET_SAP2 350 and the CX_DME_SAP 370 and communicates with the management entity 390 by the CM that is the management object of the sharing device using different wireless access schemes through the CX_DME_SAP 370.

Here, the CX_DME-SAP 370 is an SAP for communicating with different management entities 390 according to different communication schemes at a media access control (hereinafter, referred to as 'MAC') layer and a physical (hereinafter, refereed to as 'PHY') layer when each sharing devices use different communication schemes. For example, when the sharing device is the IEEE 902.11 based system, the management entity 390 is a station management entity (hereinafter, referred to as 'SME') and when the sharing device is the IEEE 802.22 based system, the management entity 390 is a network control and management system (hereinafter, referred to as 'NCMS').

In other words, the CE 360 performs communication with the system using the communication schemes different from the sharing device including the CE 360 through the CX_D-ME_SAP 370 for providing the coexistence and the frequency sharing of the sharing device.

In addition, when the CE 360 performs communication with the system using different communication schemes, that is, the management entity 390 of the sharing device through the CX_DME_SAP 370, the management entity 390 includes the CXPM entity 380. Further, the CXPM entity 380 matches primitives sent and received between the CE 360 and the sharing devices using different communication schemes with primitives or a management information base (hereinafter, referred to as 'MIB') used at the lower MAC layer structure of the PHY layer and the data link layer of the sharing device using different communication schemes so as to perform a control at the time of communication among the systems using different communication schemes.

Most preferably, the CXPM entity 380 one-to-one matches parameters between the CE 360 and the sharing devices using different communication schemes, that is, the management entity 390. In this case, the CXPM entity 380 determines the parameter matching range between the sharing devices according to whether systems controlled by the system for managing resources is accommodated for providing the coexistence and the frequency sharing between respective sharing devices. In other words, the system for managing resources determines whether the systems are accommodated in the sharing device so as to use the available frequency band through the coexistence and the frequency sharing of the sharing devices according to the CXPM entity 380 of the respective sharing devices.

The system for managing resources in the communication system in accordance with the embodiment of the present invention determines the CE reference model. The plurality of systems, that is, the systems using the same communication scheme and the systems using different communication systems use the available frequency band through the coexistence and the frequency sharing based on the CE reference models.

Next, referring to FIG. 4, the CM reference model of the system for managing resources includes an entity 410 including remote CE/CM/CDIS entity or entity such as database, or the like, each object of the resource management system, that is, CX_NET_SAPs for communicating among the CE, the CM, and the CDIS, that is, CX_NET_SAP1 420 and CX_NET_SAP2 450, an L2 transport 430 and an L3 transport 440 among the CX_NET_SAPs 420 and 450, and CM 460.

In the CM reference model, the CM 460 includes the CX_NET_SAP2 450 since the CM 460 is present in the application layer in the OSI structure. Here, the SAP is defined by a set of the SAP primitives as described above.

Further, in the CM reference model, the entity 410 including the remote CE/CM/CDIS entity or the entity such as the database, which is an object performing the communication with the CM 460 for the coexistence and the frequency sharing of the plurality of sharing devices as described above, includes the CX_NET_SAP1 420 so as to perform the communication with the CX_NET_SAP2 450 included in the CM 460 through the L2 transport 430 and the L3 transport 440. Here, the CX_NET_SAPs 420 and 450 and the L2 transport 430 and the L3 transport 440 are the same in the CE reference model described in FIG. 3 and the CX_NET_SAPs 420 and 450, the L2 transport 430, and the L3 transport 440 are described in more detail with reference to FIG. 3 and therefore, the detailed description thereof will be omitted.

That is, as described above, the entity 410 including the remote CE/CM/CDIS entity or the entity such as the database, or the like, and the CM 460 perform the communication for the coexistence and the frequency sharing of the sharing devices by using the L2 transport 430 and the L3 transport 440 by the CX_NET_SAPs 420 and 450. The system for managing resources in the communication system in accordance with the embodiment of the present invention determines the CM reference model and uses the available frequency band through the coexistence and the frequency sharing of the plurality of systems based on the CM reference model.

In addition, referring to FIG. 5, the CDIS reference model of the system for managing resources includes an entity 510 including remote CM entity or entity such as database, or the like, each object of the resource management system, that is, CX_NET_SAPs for communicating among the CE, the CM, and the CDIS, that is, CX_NET_SAP1 520 and CX_NET_SAP2 550, an L2 transport 530 and an L3 transport 540 among the CX_NET_SAPs 520 and 550, and CM 560, and a CDIS 560.

In the CDIS reference model, the CDIS 560 includes the CX_NET_SAP2 550 since the CM 460 is present in the application layer in the OSI structure. Here, the SAP is defined by a set of the SAP primitives as described above.

Further, in the CDIS reference model, the entity 510 including the remote CM/CDIS entity or the entity such as the database, which is an object performing the communication with the CDIS 560 for the coexistence and the frequency sharing of the plurality of sharing devices as described above, includes the CX_NET_SAP1 520 so as to perform the communication with the CX_NET_SAP2 550 included in the CDIS 560 through the L2 transport 530 and the L3 transport 540. Here, the CX_NET_SAPs 520 and 550 and the L2 transport 530 and the L3 transport 540 are the same in the CE reference model described in FIG. 3 and the CX_NET_SAPs 520 and 550, the L2 transport 530, and the L3 transport 540 are described in more detail with reference to FIG. 3 and therefore, the detailed description thereof will be omitted.

That is, as described in FIG. 3, the entity 510 including the remote CM entity or the entity such as the database, or the like, and the CDIS 560 perform the communication for the coexistence and the frequency sharing of the sharing devices by using the L2 transport 530 and the L3 transport 540 by the CX_NET_SAPs 520 and 550. The system for managing resources in the communication system in accordance with the embodiment of the present invention determines the CDIS reference model and uses the available frequency band through the coexistence and the frequency sharing of the plurality of systems based on the CDIS reference model.

In addition, the system for managing resources in the communication system in accordance with the embodiment of the present invention detects the available frequency bands among the frequency bands in which the plurality of systems do not have permission like the TV band and then, shares the available frequency bands through the coexistence and the frequency sharing of the plurality of systems, that is, the systems using the same communication scheme and the systems using different communication schemes in the available frequency band, in particular, defines the reference models for the CE, the CM, and the CDIS for the coexistence and the frequency sharing of the sharing devices in the plurality of systems. As described above, the reference models include the SAPs defined as the set of the SAP primitives, in particular, the CE in the CE reference model includes the CX_NET_SAP and the CX_DME_SAP and the CM and the CDIS in the CM reference model and the CDIS reference model include the CX_NET_SAP.

As described above, the CX_NET_SAP and the CX_DME_SAP in the reference model for the CE, the CM, and the CDIS defined by the system for managing resources are defined by the set of the SAP primitives, in particular, the CX_DME_SAP primitive defining the CX_DME_SAP includes a Context.Info.Get parameter, a reconfiguration. set parameter, an Event.Set parameter, and an Event.Get parameter.

Here, the Context.Info.Get parameter represents an identifier (ID) of sharing device, a position, and primitives used to allow the CE to request the information such as transmission power, or the like, as the information of the sharing device, that is, the context information from the sharing device. In addition, the reconfiguration.set parameter represents the primitive used to allow the CE to update of the configuration resetting for the sharing device according to the request for the configuration resetting of the sharing device received from the CM. Further, the Event.Set parameter represents the primitives uses to allow the CE to update the sharing device such as the event information, for example, the location change sensing results of the sharing device, or the like. Further, the Event.Get parameter represents the information related to the event from the sharing device, that is, the primitives used to receive the event information when the event is generated in the sharing device. Hereinafter, the interface corresponding to the CE reference model of the system for managing resources in a communication system in accordance with the embodiments of the present invention will be described in more detail with reference to FIGS. 6 and 7.

Figure 6:
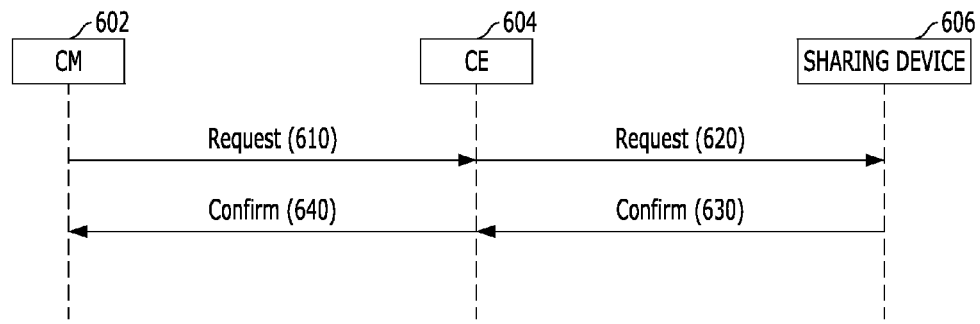
FIGS. 6 and 7 are diagrams illustrating a message sending and receiving flow for interfaces according to a CE reference model of the system for managing resources in the communication system in accordance with the embodiment of the present invention.
Figure 7:
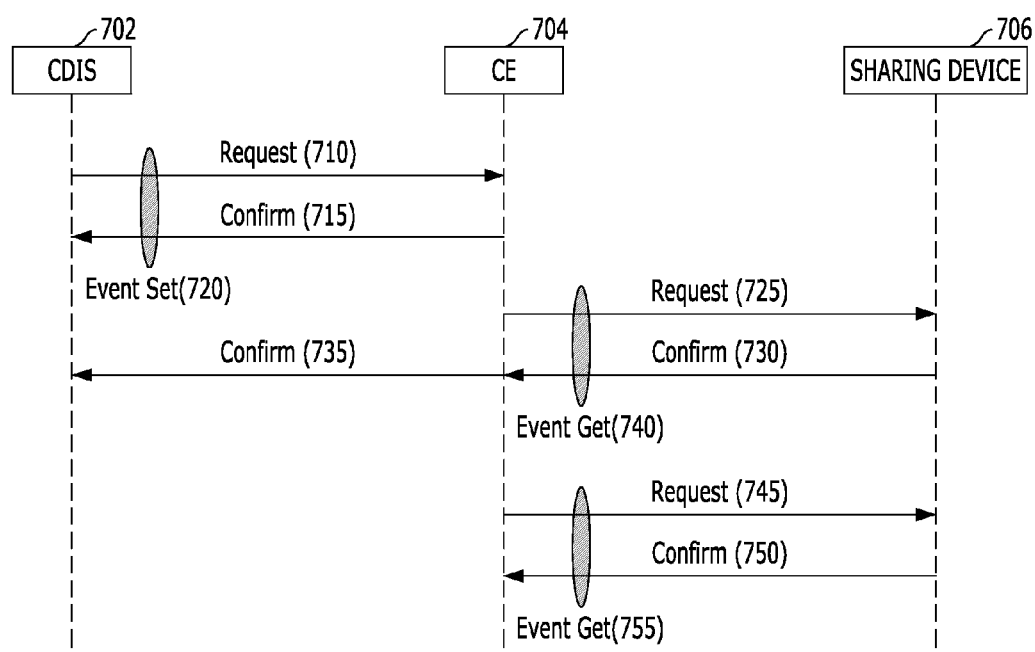

FIGS. 6 and 7 are diagrams illustrating a message sending and receiving flow for the interface according to the CE reference model of the system for managing resources in a communication system in accordance with the embodiment of the present invention. In this case, FIG. 6 is a diagram illustrating the message sending and receiving flow according to the interface among the CM, the CE, and the sharing devices corresponding to the Context.Info.Get parameter and the reconfiguration.set parameter of the CX_DME_SAP primitive in the CE reference model of the system for managing resources and FIG. 7 is a diagram illustrating a message sending and receiving flow according to the interface among the CM, the CE, and the sharing device corresponding to the Event.Set parameter and the Event.Get parameter of the CX_DME_SAP primitive in the CE reference model.

Referring first to FIG. 6, in the CE reference model, a CM 602 sends a request message to a CE 604, wherein the request message includes the Context.Info.Get primitive that is the Context.Info.Get parameter for getting the context information of a sharing device 606 and the reconfiguration.set parameter that is the reconfiguration.set primitive for the reconfiguration setting of the sharing device 606 (S610).

Further, the CE 604 sends the request message including the Context.Info.Get primitive and the reconfiguration.set primitive from the CM 602 and sends the received request message to the sharing device 606 (S620).

In addition, the sharing device 606 receives the request message from the CM 602 and updates the reconfiguration of the sharing device 606 corresponding to the reconfiguration-.set primitive included in the request message. Further, the sharing device 606 sends the confirm message to the CE 604 (S630), wherein the confirm message includes the reconfiguration update confirmation information of the sharing device 606 corresponding to the reconfiguration.set primitive and the context information of the sharing device 606 corresponding to the Context.Info.Get primitive included in the request message (S630).

As described above, the Context.Info.Get primitive includes the ID, type, transmission power, and position of the sharing device 606 and the ID, type, transmission power, and position of the sharing device 606 included in the confirm message as the context information of the sharing device 606 are sent to the CE 604 corresponding to the Context.Info.Get primitive.

Further, the CE 604 receives the confirm message from the sharing device 606 in response to the request message and sends the received confirm message to the CM 602 (S640).

In the CE reference model of the system for managing resources, the CM 602, the CE 604, and the sharing device 606 sends and receives the message, that is, sends and receives the signal for the coexistence and the frequency sharing of the plurality of systems according to the interface defined by the system for managing resources corresponding to the Context.Info.Get parameter and the reconfiguration.set parameter of the CX_DME_SAP primitive to allow the plurality of systems to share the available frequency band among the frequency bands that are used in advance like the TV bank through the coexistence and the frequency sharing.

Next, referring to FIG. 7, in the CE reference model, a CM 702 sends a request message to a CE 704 (S710), wherein the request message an Event.Set primitive 720 that is the Event. Set parameter for setting the event information of the sharing device 706.

Further, the CE 704 receives the request message including the Event.Set primitive 720 and sends the confirm message of the reception of the request message including the Event.Set primitive 720 to the CM 702 corresponding to the reception of the request message (S715).

In addition, the CE 704 sends the request message to the sharing device 706 (S725 and S745), wherein the request message includes the Event.Set primitives 740 and 755 that is the Event.Get parameter for getting the event information of the sharing device 706 corresponding to the request message including the Event.Set primitive 720.

In this case, the sharing device 706 receives the request message including the Event.Get primitives 740 and 750 from the CE 704 and confirms whether the event of the sharing device 706 is generated corresponding to the Event.Get primitives 740 and 750 included in the request message.

As the confirmation result, when the event is generated in the sharing device 706, the sharing device 706 sends the confirmation message including the event information corresponding to the generated event to the CE 705 according to the Event.Get primitive 740 (S730).

Further, the CE 704 receives the confirm message including the event information the Event.Get primitive 740 as the response of the request message including the Event.Get primitive 740 according to the Event.Get primitive 740 and sends the confirmation message including the event information to the CM 702.

As the confirmation result, when the event is generated in the sharing device 706, the sharing device 706 sends the confirmation message for the non-generation of the event to the CE 704 according to the Event.Get primitive 755 (S730).

Further, the CE 704 receives the confirmation message for the non-generation of the event according to the Event.Get primitive 750 as the response of the request message including the Event.Get primitive 755.

Herein, in order to receive the event generation of the sharing device 706 and the event information of the sharing device 706 corresponding to the event generation, the request message including the Event.Get primitives 740 and 755 is periodically sent to the sharing device 706 and the sharing device 706 confirms whether the event of the sharing device 706 is generated at the time of receiving the request message including the Event.Get primitives 740 and 755.

In the CE reference model of the system for managing resources, the CM 702, the CE 704, and the sharing device 706 sends and receives the message, that is, sends and receives the signal for the coexistence and the frequency sharing of the plurality of systems according to the interface defined by the system for managing resources corresponding to the Event.Set parameter and the Event.Get parameter of the CX_DME_SAP primitive to allow the plurality of systems to share the available frequency band among the frequency bands that are used in advance like the TV bank through the coexistence and the frequency sharing.

As described above, the system for managing resources defines the interface among the CMs 602 and 702, the CEs 604 and 704, and the sharing devices 606 and 706 through a transmission control protocol (TCP)/internet protocol (IP). In other words, in the system for managing resources in the communication system in accordance with the embodiment of the present invention, the primary system detects the frequency bands that can be used by the plurality of systems in the frequency bands used in advance and defines the reference model and the interface for the coexistence and the frequency sharing of the plurality of systems in the available frequency bands, and the plurality of systems share the available frequency band through the coexistence and the frequency sharing according to the reference models and the interfaces.

In addition, as described in FIG. 1, the system for managing resources in the communication system in accordance with the embodiment of the present invention defines the reference model to share the coexistence and the frequency sharing of the sharing devices 140 and 160 for the available frequency bands in the frequency bands used in advance, that is, share the plurality of different systems using different communication schemes, in particular, defines each reference models for the coexistence and the frequency sharing of different systems for the CDIS 110, the CMs 120 and 130, and the CEs 140 and 160. Further, as described above, the system for managing resources defines the interfaces for each CM 120 and 130 and each CE 140 and 160 so as to provide the coexistence and the frequency sharing of the sharing devices 140 and 160, that is, allow the plurality of systems of different communication schemes to share the frequency.

In this case, the interface among respective objects, that is, the CDIS 110, the CMs 120 and 130, and the CEs 140 and 160 that are defined by the system for managing resources in the communication system in accordance with the embodiment of the present invention defines the interface among the CMs 120 and 130 and the CEs 140 and 160, the interface among the CMs 120 and 130 and the CDIS 110, and the interface between the CMs 120 and 130, respectively. As described above, the interface between the CMs 120 and 130 allows the plurality of different systems to share the available frequency bands the CMs managing each of the sharing devices of the plurality of systems are each present, such that the system for managing resources defines the interface between the plurality of CMs corresponding to each of the plurality of systems. In particular, any CM includes a master CM controlling the remaining CMs in the plurality of CMs and a slave CM controlled by the master CM and the system for managing resources defines the interface between the master CM and the slave CM. In addition, the system for managing resources defines the interface between any CM in the plurality of CMs and a CM neighbor to any CM.

Further, the system for managing resources defines the state machine of the CDIS 110, the CMs 120 and 130, and the CEs 140 and 160 so as to define the interface among the CDIS 110, the CMs 120 and 130, and the CEs 140 and 160 that are each object. In the defined state machine, the interface is defined by sending and receiving the message among the CDIS 110, the CMs 120 and 130, and the CEs 140 and 160. Here, the state in the state machine in the CDIS 110, the CMs 120 and 130, and the CEs 140 and 160 includes inactive, active, waiting engagement, engaged, request sent, and request received.

The inactive, which is a state before an initialization process of each object, means the state in which the interface setup with other objects is impossible and the active means a state prepared to enable the interface setup with other objects. Further, the waiting engagement means the state in which the response of the request waits from the relative object after requesting the interface setup to the relative object and the engaged means a state in which the message can be sent and received to and from the relative object when the interface setup with the relative object is completed. Further, the request sent means a state waiting for the response of the message sent from the object after the message including the request matters is sent to the relative object and the request received means a state processing the request matters of the relative object after the message including the request matters is received from the relative object. Hereinafter, the interface definition between the CM and the CE of the system for managing resources in the communication system in accordance with the embodiments of the present invention will be described in more detail with reference to FIGS. 8 and 10.

Figure 8:
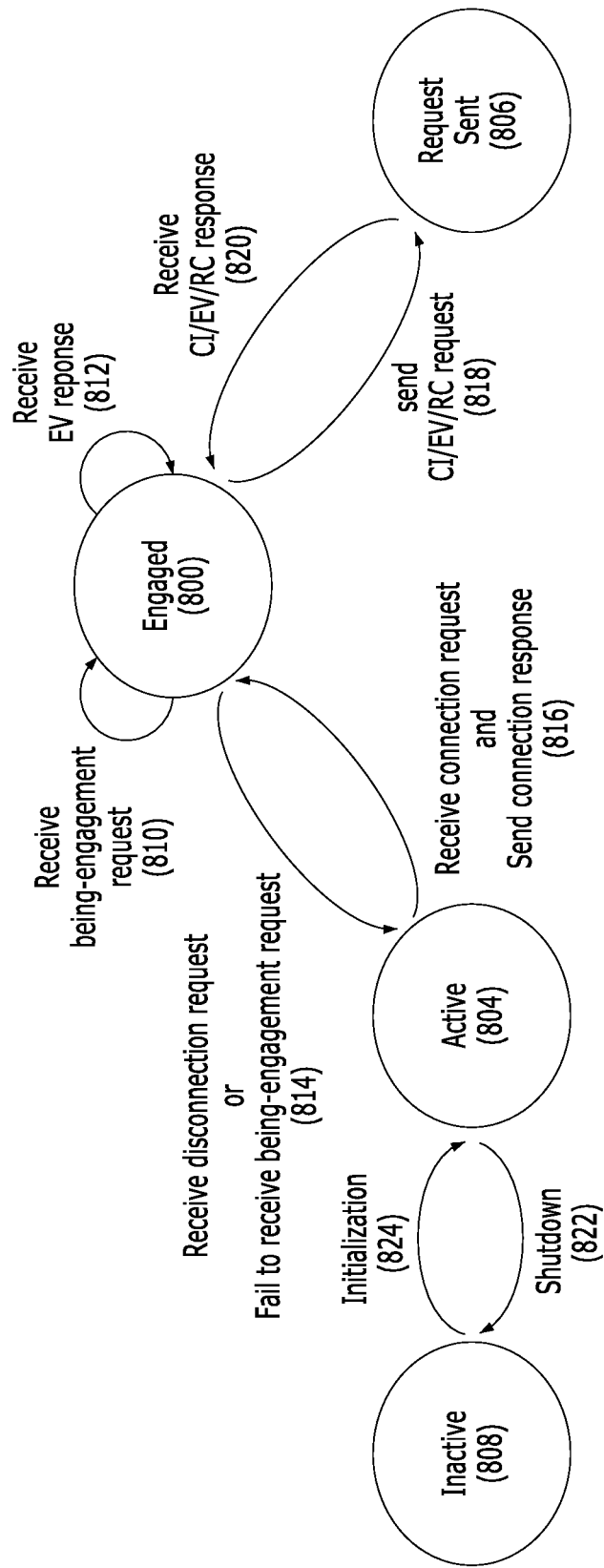
FIGS. 8 to 10 are diagrams for explaining interface definition between CM and CE of the system for managing resources in the communication system in accordance with the embodiment of the present invention.
Figure 9:
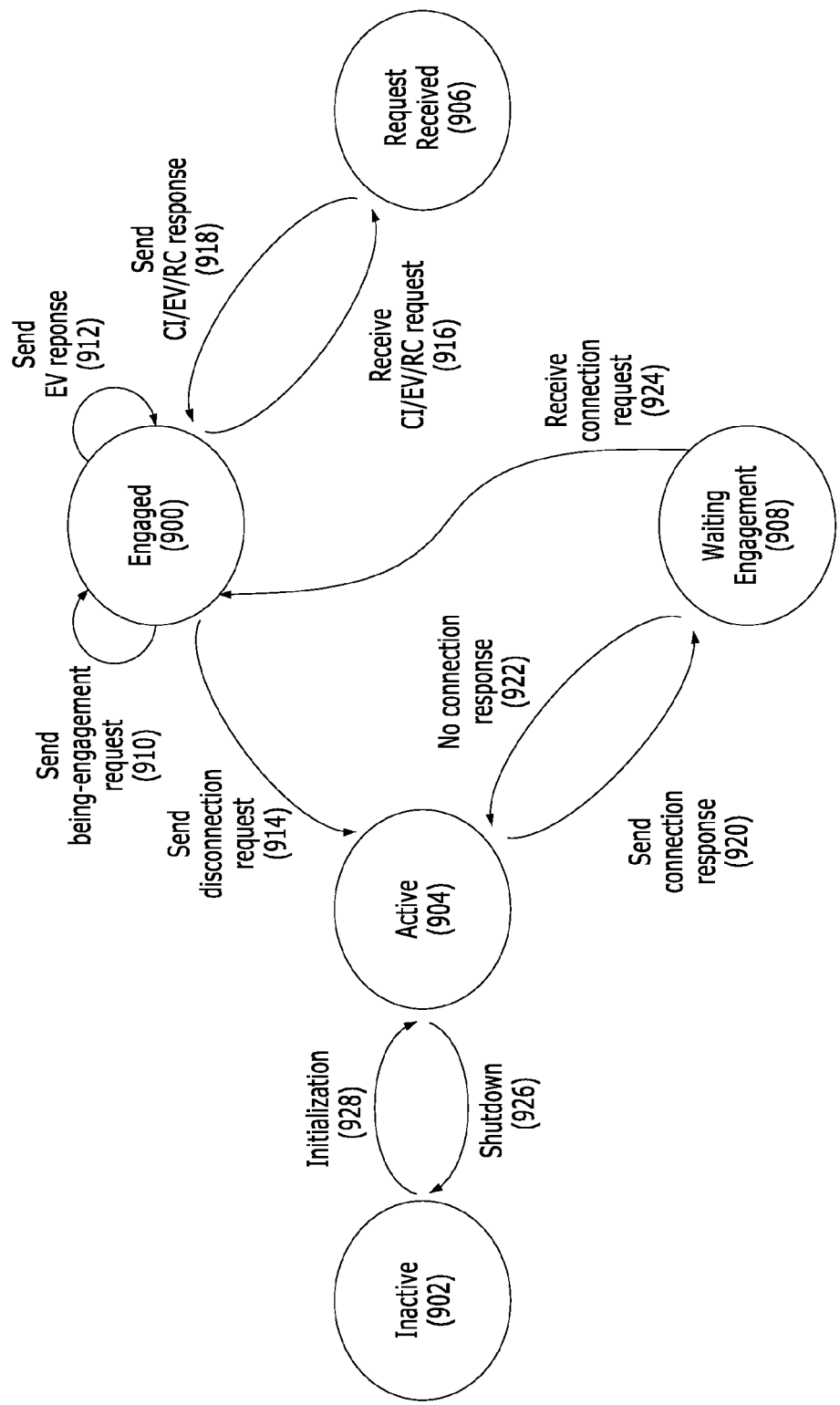
Figure 10:
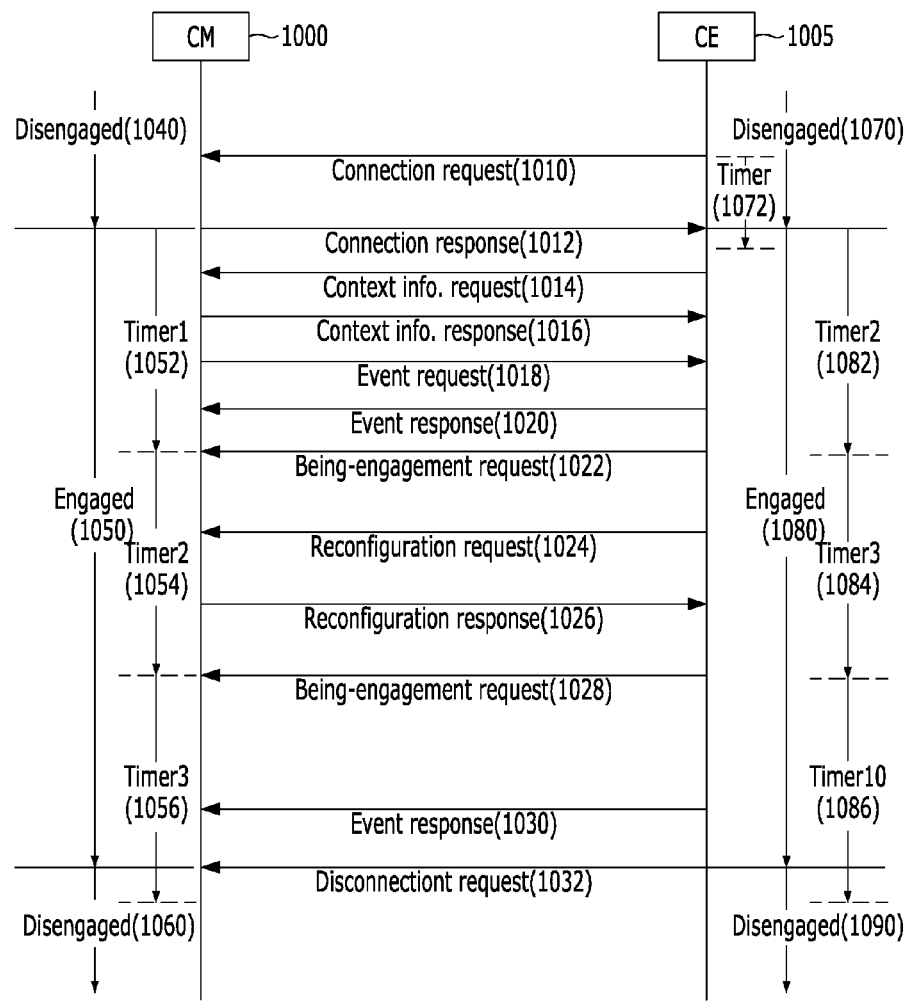

FIGS. 8 to 10 are diagrams for explaining the interface definition between the CM and the CE of the system for managing resources in the communication system in accordance with the embodiment of the present invention.

FIG. 8 is a diagram schematically illustrating a state diagram of the CM in the interface definition between the CM and the CE of the system for managing resources, FIG. 9 is a diagram schematically illustrating a state diagram of the CM in the interface definition between the CM and the CE of the system for managing resources, and FIG. 10 is a diagram schematically illustrating a message sending and receiving procedure between the CM and the CE for the interface definition between the CM and the CE of the resource management system.

Describing the state of the CM with reference first to FIG. 8, the CM is switched to an active state 804 through the initialization process 824 in the inactive state 802 in the interface definition between the CM and the CE of the system for managing resources. Further, the CM is switched to the inactive state 802 through a shutdown 822 in the active state 804.

In addition, the CM sends a connection response as the response of the connection request to the CE 816 and is then switched to the engaged state 800 when the connection request is received from the CE in the active state 804

Further, the CM send context information (CI)/event information (EV)/reconfiguration request (RCReConfiguration) (send CI/EV/RC request) of the sharing device to the CE in the engaged state 800 (818) and is switched to the request send state 806 and is switched to the engaged state 800 when receiving the context information/event information/reconfiguration response (CI/EV/RC response) as the response for the request sent from the CE (receive CI/EV/RC response) (820). In this case, the CM sends the reconfiguration request to the CE according to the coexistence decision of the CM in the engaged state 800 (818) and is switched to the request sent state 806 and is switched to the engaged state 800 when receiving the reconfiguration response from the CE (820).

Further, the CM receives the event response (EV response) corresponding to the generated event from the CE (812) when the predetermined specific event is generated in the CE by the CM even though the request of the CM is absent in the engaged state 800. In addition, the CM periodically receives a being-engagement request from the CE in the engaged state 800 to maintain the engaged state 800.

Further, the CM receives a disconnection request from the CE in the engaged state 800 or fail to periodically receive the being-engagement request from the CE in the engaged state 800 (814) and is switched to the active state 804 after the connection with the CE ends.

Next, describing the state of the CE with reference to FIG. 9, the CE is switched to an active state 904 through an initialization process 928 in the inactive state 802 in the interface definition between the CM and the CE of the system for managing resources. Further, the CE is switched to the inactive state 904 through a shutdown 926 in the active state 902.

In addition, the CE is switched to a waiting engaged state 908 after sending the connection request to the CM in the active state 904. Further, the CE is switched to the active state 904 when no receiving the connection response from the CM within the predetermined time in the waiting engaged state 908 (922). Meanwhile, the CE is switched to the engaged state 900 when receiving the connection response from the CM within the predetermined time in the waiting engaged state 908 (924).

Further, the CE is switched to the request received state 906 when receiving the context information/event information/reconfiguration request of the sharing device from the CM in the engaged state 900 and sends the context information, the event information, and the reconfiguration response as the response to the request received to the CM and is switched to the engaged state 900.

Further, the CE sends the event response (EV response) corresponding to the generated event to the CM (912) when the predetermined specific event is generated in the CE by the CM even though the request of the CM is absent in the engaged state 900. In addition, the CE periodically sends the being-engagement request to the CM in the engaged state 900 (910) and maintains the engaged state 900.

Further, the CE sends the disconnection request to the CM in the engaged state 900 (914) and is then switched to the active state 904 after the connection with the CM ends.

Then, describing the message sending and receiving between the CM and the CE for the interface between the CM and the CE with reference to FIG. 10, a CE 1005 in a disengaged state 1040, for example, the active state sends the connection request message to a CM 1000 that is the disengaged state 1040, for example, the active state (S1010) In this case, the CE 1005 operates timer 1 1072 of the CE 1005 for confirming whether the response for the connection request is received from the CM 1000 within a predetermined time after sending the connection request message and the CE 1005 is switched to the waiting engaged state.

Further, the CM 1000 receives the connection request message from the CE 1005 and sends the connection response message as the response for the connection request message to the CE 1005 (S1012). In this case, the CM 1000 sends the connection response message and is switched to an engaged state 1050 in the disengaged state 1040 and the CM 1000 in the engaged state 1050 sets a period for maintaining the engagement and timer 1 1052, timer 2 1054, and timer 3 1056 of the CM 1000 are operated for each period for maintaining the engagement in the engaged state 1050.

In addition, when the CE 1005 receives the connection response message from the CM 1000 during the operation of the timer 1 1072 of the CM 1005, that is, within the predetermined time, the CE 1005 is switched from the disengaged state 1070 to the engaged state 1080. In addition, timer 2 1082, timer 3 1084, and timer 4 1086 of the CE 1005 are operated in the engaged state 1080 according to the period for maintaining the engagement set in the CM 1000.

Here, the CE 1005 sends the being-engagement request message to the CM 1000 when the timer 1 1052 of the CM 1000 and the timer 2 1082 of the CM 1005 end according to the period in which the engagement is maintained (S1022) and sends the being-engagement request message to the CM 1000 when the timer 2 1054 of the CM 1000 and the timer 3 1084 of the CE 1005 end (S1028).

Further, the CM 1000 in the engaged state 1050 sends the context info.request message for requesting the context information of the sharing device to the CE 1005 in the engaged state 1080 (S1014). Then, the CE 1005 receives the context info.request message and sends the context info response message including the context information as the response for the context information request message to the CM 1000 in the engaged state 1050 (S1016).

Further, the CM 1000 in the engaged state 1050 sends the event request message for requesting the context information of the sharing device to the CE 1005 in the engaged state 1080 (S1018). Then, the CE 1005 receives the event information request message and sends the event response message including the event information corresponding to the event generated from the CE 1005 as the response for the event information request message to the CM 1000 in the engaged state 1050 (S1020). Here, the CE 1005 in the engaged state 1080 sends the event response message including the event information corresponding to the generated event to the CM 1000 in the engaged state 1050 when the predetermined event is generated from the CE 1005 by the CM 1000 even though the event information request message is not received from the CM 1000 (S1030).

Further, the CM 1000 in the engaged state 1050 sends the reconfiguration request message for resetting, that is, the reconfiguring the configuration of the shared device to the CE 1005 in the engaged state 1080 (S1024).

Then, the CE 1005 receives the reconfiguration request message and reconfigures the configuration of the sharing device as the response for the event information request message and then sends the reconfiguration response message including the information on the reconfiguration to the CM 1000 in the engaged state 1050 (S1026).

In this case, when the CE 1005 in the engaged state 1080 wants to end the connection with the CM 1000, the CE 1005 in the engaged state 1080 sends the disconnection request message to the CM 1000 in the engaged state 1050 (S1032) and the CE 1005 in the engaged state 1080 ends the connection with the CM 1000 and is switched to the disengaged state 1090, that is, the active state. In addition, the CM 1000 in the engaged state 1050 receives the disconnection request message and is switched to the disengaged state 1060, that is, the active state after the connection with the CE 1005 ends. Hereinafter, the interface definition between the CM and the CDIS of the system for managing resources in the communication system in accordance with the embodiments of the present invention will be described in more detail with reference to FIGS. 11 and 13.

Figure 11:
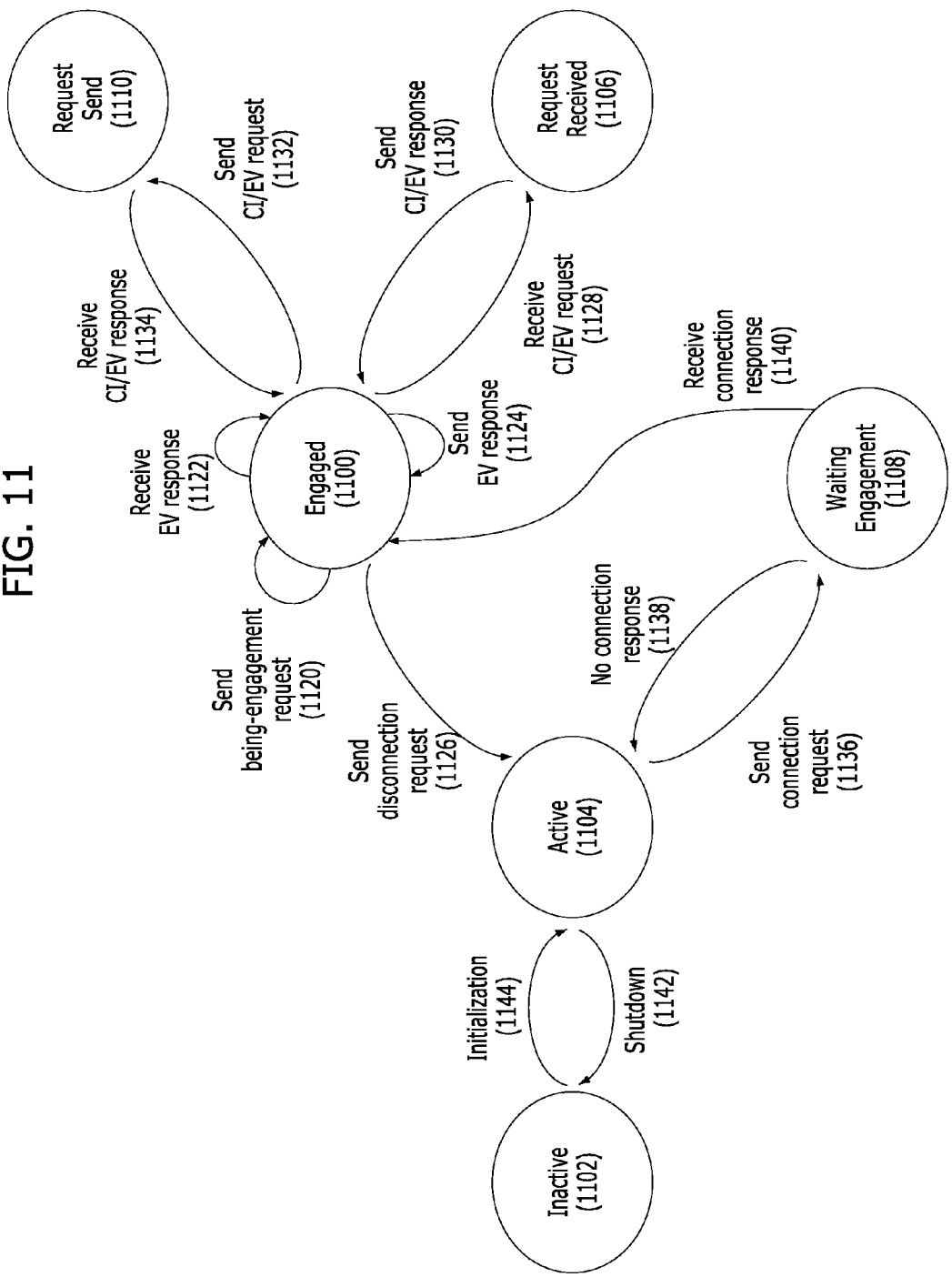
FIGS. 11 to 13 are diagrams for explaining interface definition between CM and CDIS of the system for managing resources in the communication system in accordance with the embodiment of the present invention.
Figure 12:
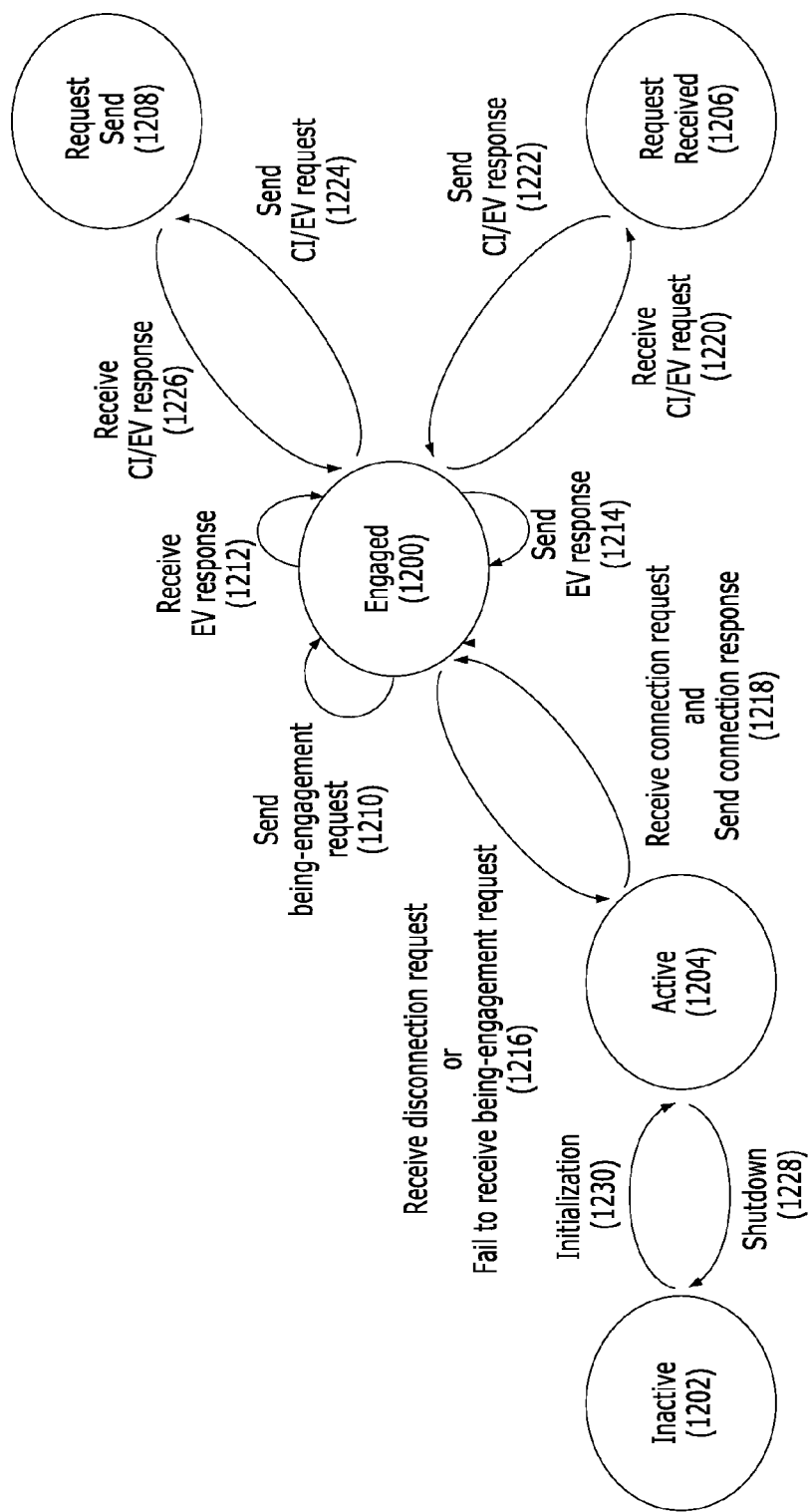
Figure 13:
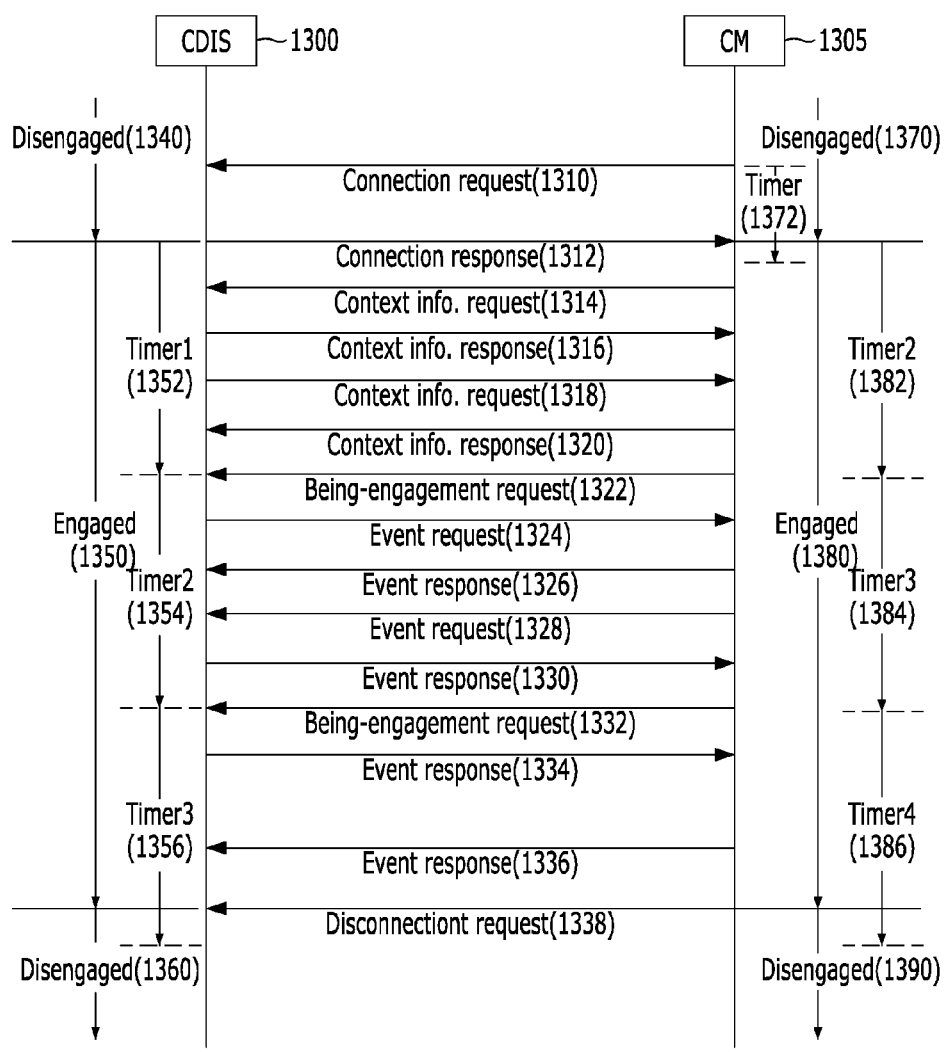

FIGS. 11 to 13 are diagrams for explaining interface definition between CM and CDIS of the system for managing resources in the communication system in accordance with the embodiment of the present invention.

FIG. 11 is a diagram schematically illustrating a state diagram of the CM in the interface definition between the CM and the CDIS of the system for managing resources, FIG. 12 is a diagram schematically illustrating a state diagram of the CDIS in the interface definition between the CM and the CDIS of the system for managing resources, and FIG. 13 is a diagram schematically illustrating a message transmitting and receiving procedure between the CM and the CDIS for the interface definition between the CM and the CDIS of the resource management system.

Describing the state of the CM with reference first to FIG. 11, the CM is switched to an active state 1104 through the initialization process 1144 in the inactive state 1102 in the interface definition between the CM and the CDIS of the system for managing resources. Further, the CM is switched to the inactive state 1104 through a shutdown 1142 in the active state 1102.

In addition, the CM is switched to a waiting engaged state 1108 after sending the connection request to the CDIS in the active state 1104. Further, the CM is switched to the active state 1104 when no receiving the connection response from the CDIS within the predetermined time in the waiting engaged state 1108 (1138). Meanwhile, the CM is switched to the engaged state 1100 when receiving the connection response from the CDIS within the predetermined time in the waiting engaged state 1108 (1140).

Further, the CM is switched to the request received state 1106 when receives the context information/event information request (CI/EV request) of the sharing device from the CDIS in the engaged state 1100 and sends the context information/event response (CE/EV response) as the response for the request received to the CDIS (send CI/EV response) (1130) and is switched to the engaged state 1100.

Further, the CM sends the event response corresponding to the generated event from the CM to the CDIS (1124) when the predetermined specific event is generated in the CM by the CDIS even though the request of the CDIS is absent in the engaged state 1100. In addition, the CM periodically sends the being-engagement request to the CDIS in the engaged state 1100 (1120) and maintains the engaged state 1100.

Further, the CM sends the context information/event information request of the sharing device to the CDIS in the engaged state 1000 (1132) and is then switched to the request sent state 1110 and receives the context information/event response as the response for the request sent from the CDIS (1134) and is switched to the engaged state 1100.

Further, the CM receives the event response corresponding to the generated event from the CDIS (1122) when the predetermined specific event is generated in the CDIS by the CM even though the request of the CM is absent in the engaged state 1100. Further, the CM sends the disconnection request to the CDIS in the engaged state 1100 (1126) and is then switched to the active state 1104 after the connection with the CDIS ends.

Next, describing the state of the CDIS with reference to FIG. 12, the CDIS is switched to an active state 1204 through an initialization process 1230 in the inactive state 1202 in the interface definition between the CM and the CDIS of the system for managing resources. Further, the CDIS is switched to the inactive state 1202 through a shutdown 1228 in the active state 1202.

In addition, the CDIS sends the connection response as the response of the connection request to the CM and is then switched to the engaged state 1200 when receiving the connection request from the CM in the active state 1204.

Further, the CDIS is switched to the request received state 1206 when receiving the context information/event information/reconfiguration request of the sharing device from the CM in the engaged state 1206 and sends the context information/event response as the response to the request received to the CM (1222) and is switched to the engaged state 1200.

Further, the CDIS sends the event response (EV response) corresponding to the generated event from the CM (1214) when the predetermined specific event is generated in the CE by the CM even though the request of the CM is absent in the engaged state 1200.

Further, the CDIS sends the context information/event information request of the sharing device to the CM in the engaged state 1200 (1224) and is then switched to the request sent state 1208 and receives the context information/event response as the response for the request sent from the CM (1226) and is switched to the engaged state 1200.

Further, the CDIS sends the event response (EV response) corresponding to the generated event from the CM (1212) when the predetermined specific event is generated in the CM by the CDIS even though the request of the CDIS is absent in the engaged state 1200.

In addition, the CDIS periodically receives the being-engagement request to the CM from the CM in the engaged state 1200 (1210) and maintains the engaged state 1200.

Further, the CDIS receives a disconnection request from the CM in the engaged state 1200 or fail to periodically receive the being-engagement request from the CM in the engaged state 1200 (1216) and is switched to the active state 1204 after the connection with the CE ends.

Then, describing the message sending and receiving between the CM and the CDIS for the interface between the CM and the CDIS with reference to FIG. 13, a CM 1305 in a disengaged state 1370, for example, the active state sends the connection request message to a CDIS 1305 that is the disengaged state 1040, for example, the active state (S1310) In this case, the CM 1305 operates timer 1 1372 of the CM 1305 for confirming whether the response for the connection request is received from the CDIS 1300 within a predetermined time after transmitting the connection request message and the CM 1305 is switched to the waiting engaged state.

Further, the CDIS1300 receives the connection request message from the CM 1305 and sends the connection response message as the response for the connection request message to the CM 1305 (S1312). In this case, the CDIS 1300 sends the connection response message and is switched to an engaged state 1050 in the disengaged state 1340 and the CDIS 1300 in the engaged state 1350 sets a period for maintaining the engagement and timer 1 1352, timer 2 1354, and timer 3 1356 of the CDIS 1300 are operated for each period for maintaining the engagement in the engaged state 1354.

In addition, when the CM 1305 receives the connection response message from the CDIS 1305 during the operation of the timer 1 1372 of the CM 1305, that is, within the predetermined time, the CM 1305 is switched from the disengaged state 1370 to the engaged state 1380. In addition, timer 2 1382, timer 3 1384, and timer 4 1386 of the CM 1300 are operated in the engaged state 1380 according to the period for maintaining the engagement set in the CDIS 1300.

Here, the CM 1305 sends the being-engagement request message to the CDIS 1300 when the timer 1 1352 of the CDIS 1300 and the timer 2 1382 of the CM 1305 end according to the period in which the engagement is maintained (S1322) and the CM 1305 sends the being-engagement request message to the CDIS 1300 when the timer 2 1354 of the CDIS 1300 and the timer 3 1384 of the CM 1305 end (S1322).

Further, the CM 1305 in the engaged state 1380 sends the context info.request message for requesting the context information of the sharing device to the CDIS 1300 of the engaged state 1350 (S1314). Then, the CDIS 1300 receives the context info.request message and sends the context info.response message including the context information as the response for the context information request message to the CM 1305 in the engaged state 1380 (S1316).

Further, the CDIS 1300 in the engaged state 1380 sends the context info.request message for requesting the context information of the sharing device to the CM 1305 in the engaged state 1350 (S1318). Then, the CM 1305 receives the context info.request message and sends the context info.response message including the context information as the response for the context info.request message to the CDIS 1300 in the engaged state 1350 (S1320).

Further, the CDIS 1300 in the engaged state 1350 sends the event request message for requesting the context information of the sharing device to the CM 1305 in the engaged state 1380 (S1324). Then, the CM 1305 receives the event information request message and sends the event response message including the event information corresponding to the event generated from the CM 1305 as the response for the event information request message to the CDIS 1300 in the engaged state 1350 (S1326). Here, the CM 1305 in the engaged state 1380 sends the event response message including the event information corresponding to the generated event to the CDIS 1300 in the engaged state 1350 when the predetermined event is generated from the CM 1305 by the CDIS 1300 even though the event information request message is not received from the CDIS 1300 (S1336).

Further, the CM 1305 in the engaged state 1380 sends the event request message for requesting the event information of the sharing device to the CDIS 1300 in the engaged state 1350 (S1328). Then, the CDIS 1300 receives the event information request message and sends the event response message including the event information corresponding to the event generated from the CDIS 1300 as the response for the event information request message to the CM 1305 in the engaged state 1380 (S1330). Here, the CDIS 1300 in the engaged state 1350 sends the event response message including the event information corresponding to the generated event to the CM 1305 of the engaged state 1380 when the predetermined event is generated from the CDIS 1300 by the CM 1305 even though the event information request message is not received from the CM 1305 (S1334).

In this case, when the CM 1305 in the engaged state 1380 wants to end the connection with the CDIS 1300, the CE 1305 in the engaged state 1380 sends the disconnection request message to the CDIS 1300 in the engaged state 1350 (S1338)

and the CM 1305 in the engaged state 1380 ends the connection with the CDIS 1300 and is switched to the disengaged state 1390, that is, the active state. In addition, the CDIS 1300 in the engaged state 1350 receives the disconnection request message and is switched to the disengaged state 1360, that is, the active state after the connection with the CM 1305 ends. Hereinafter, the interface definition between the CMs of the system for managing resources in the communication system in accordance with the embodiments of the present invention will be described in more detail with reference to FIGS. 14 and 18.

Figure 14:
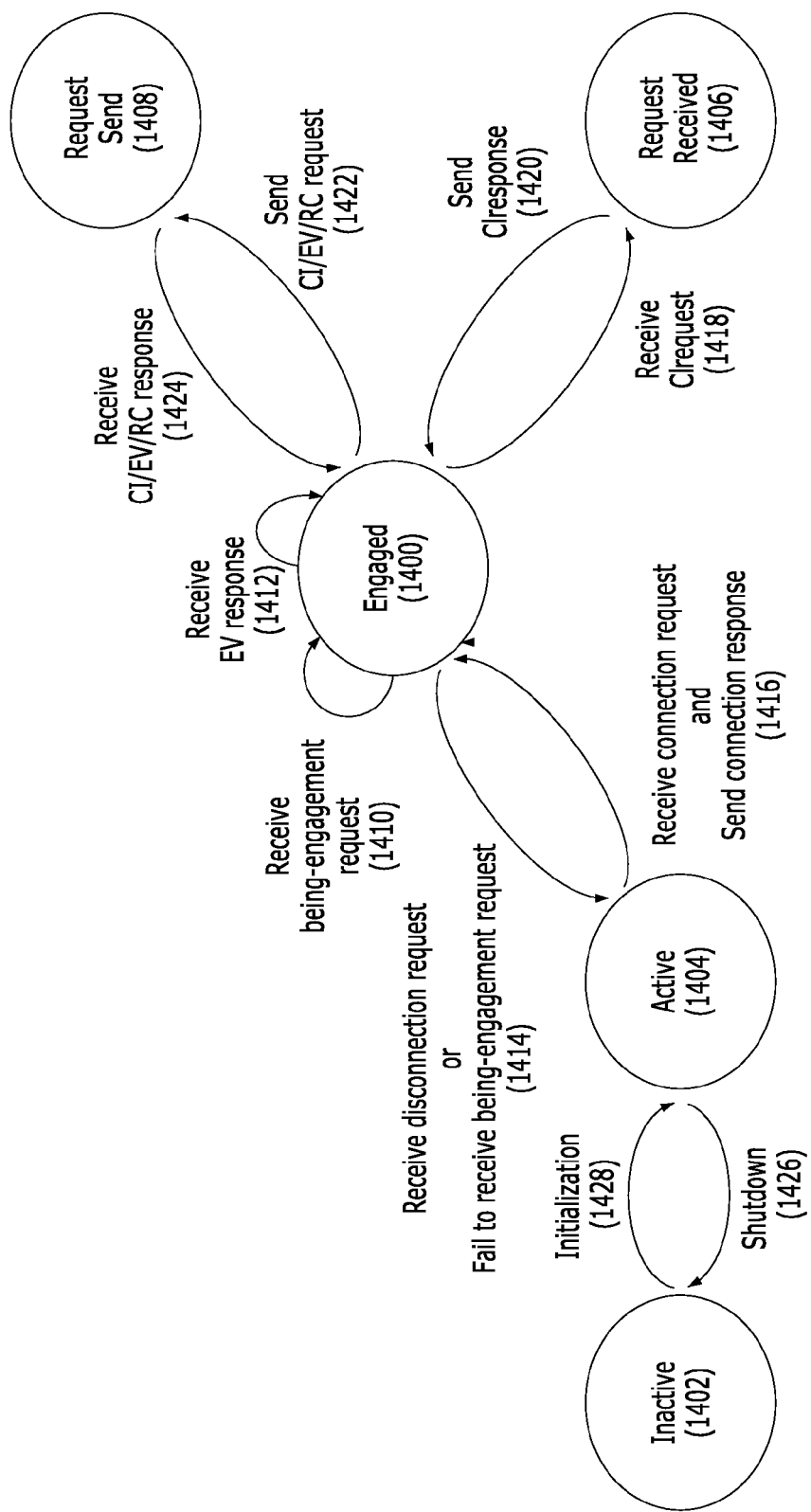
FIGS. 14 to 18 are diagrams for explaining interface definition between CMs of the system for managing resources in the communication system in accordance with the embodiment of the present invention.
Figure 15:
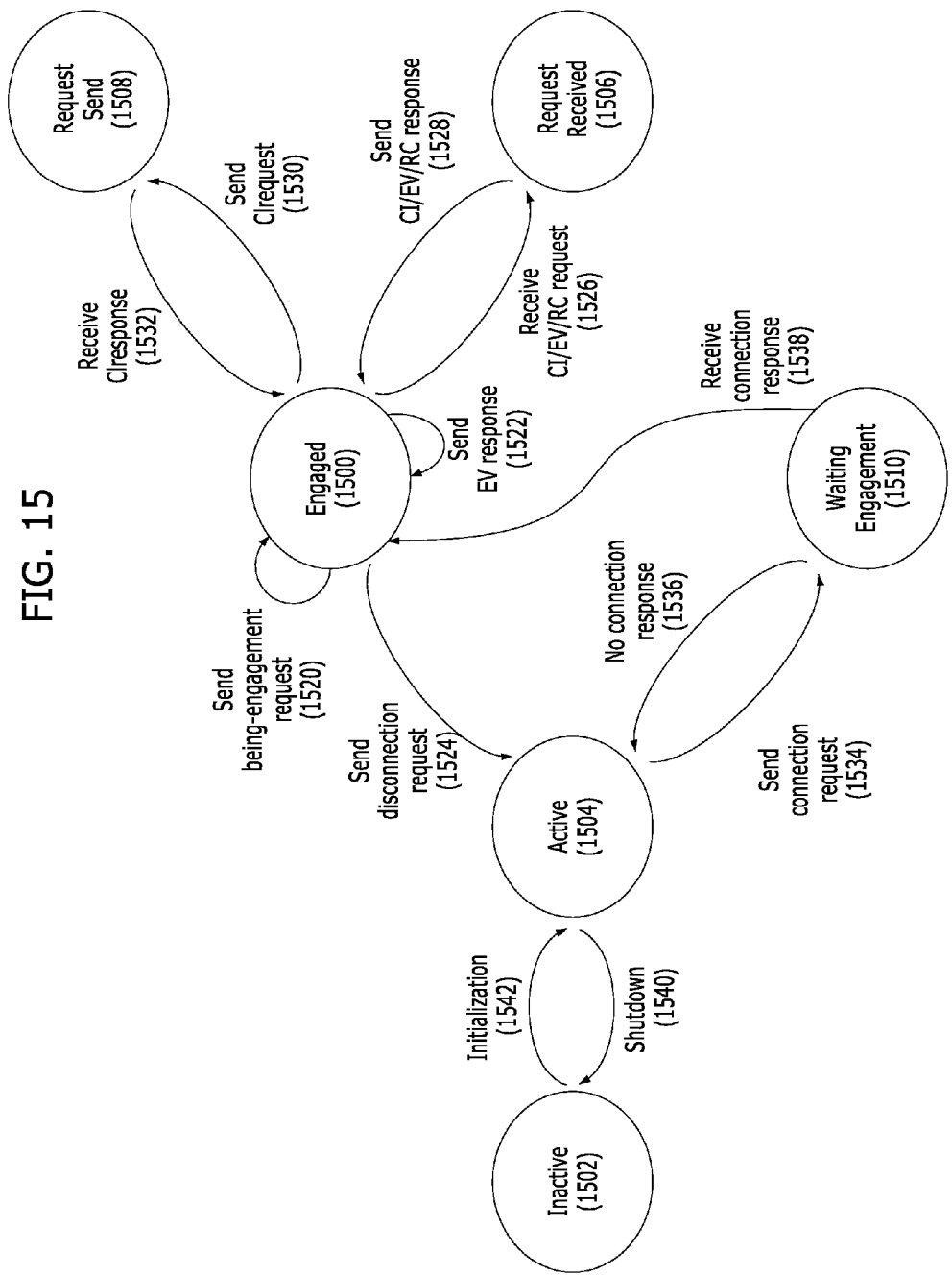
Figure 16:
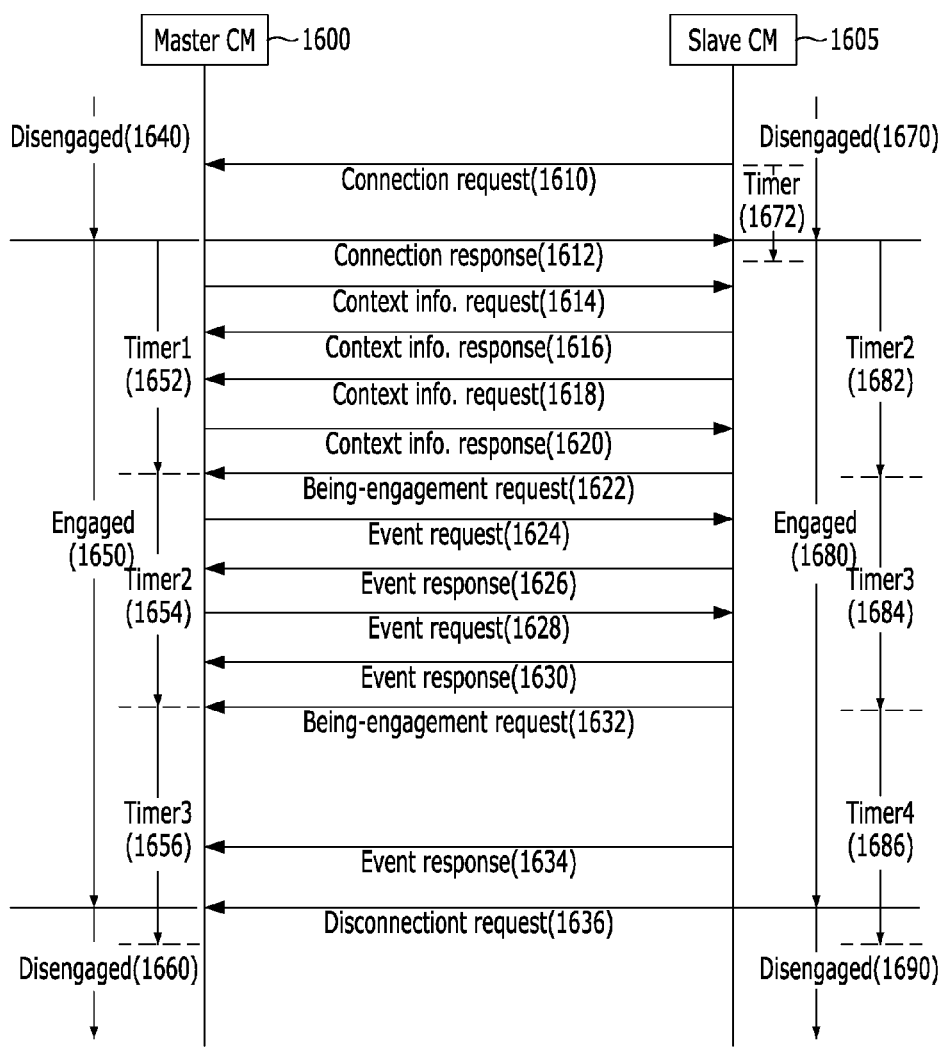
Figure 17:
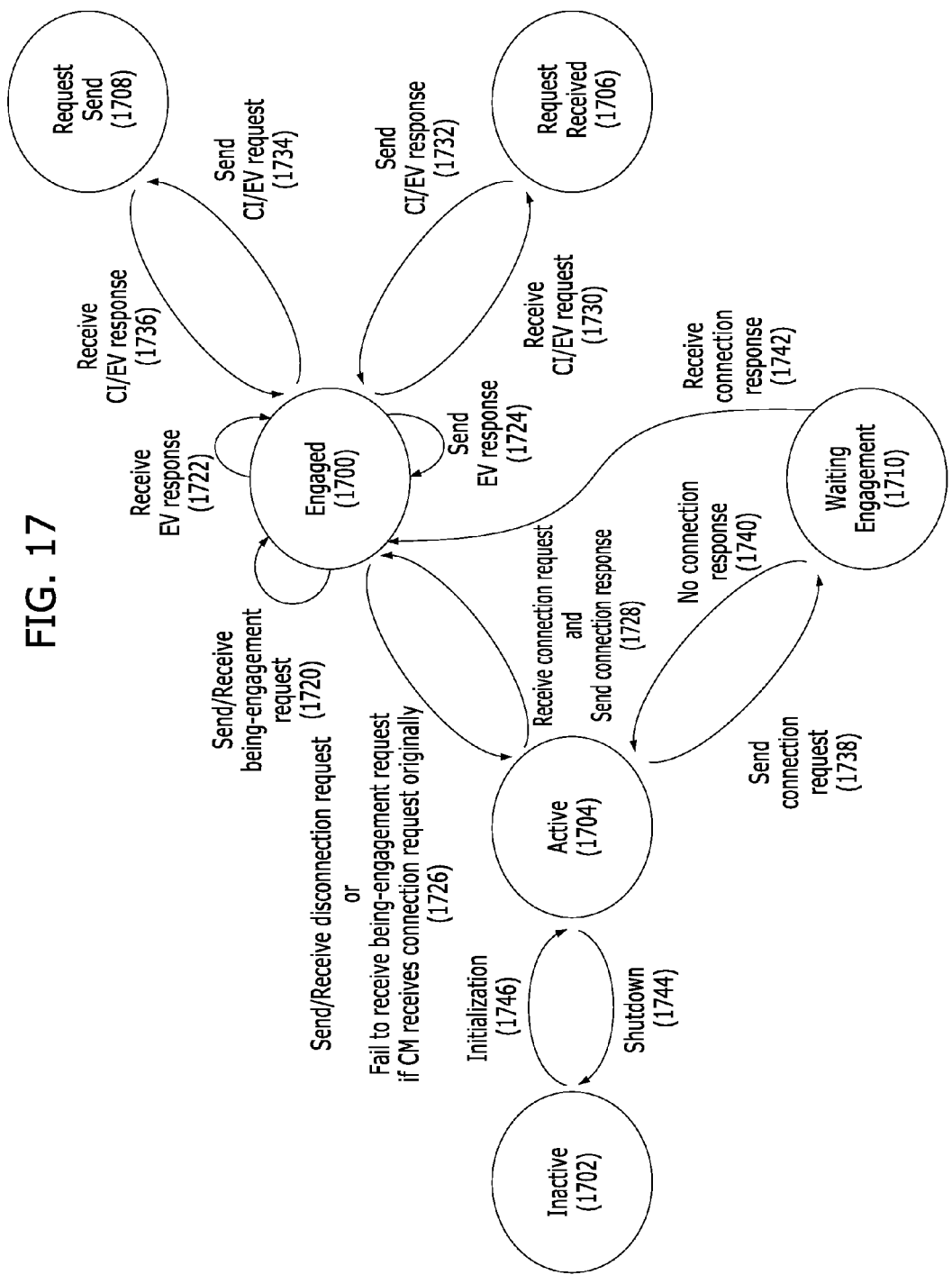
Figure 18:
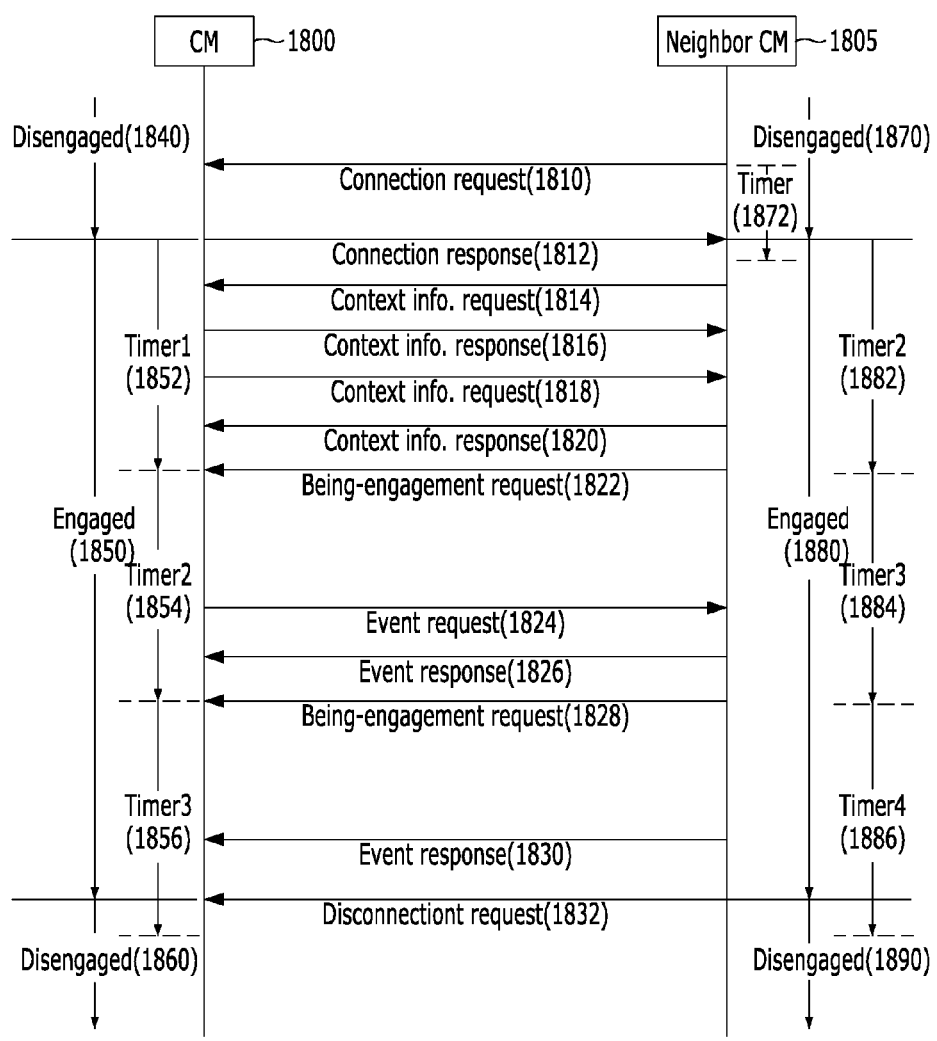

FIGS. 14 to 18 are diagrams for explaining interface definition between CMs of the system for managing resources in the communication system in accordance with the embodiment of the present invention. In particular, FIGS. 14 to 16 are diagrams for explaining the interface definition between the master CM and the slave MC of the system for managing resources and FIGS. 17 and 18 are diagrams for explaining the interface definition between any CM and the neighbor CM of the system for managing resources. FIG. 14 is a diagram schematically illustrating a state diagram of the master CM in the interface definition between the master CM and the slave CM of the system for managing resources, FIG. 15 is a diagram schematically illustrating a state diagram of the slave CM in the interface definition between the master CM and the slave CM of the system for managing resources, and FIG. 16 is a diagram schematically illustrating a message transmitting and receiving procedure between the master CM and the slave CM for the interface definition between the master CM and the slave CM of the resource management system. In addition, FIG. 17 is a diagram schematically illustrating a state diagram in the interface definition between any CM and the neighbor CM of the system for managing resources and FIG. 18 is a diagram schematically illustrating a message sending and receiving procedure between any CM and the neighbor CM for interface definition between any CM and the neighbor CM of the system for managing resources.

Further, at the time of the interface definition between the CMs of the system for managing resources in the communication system in accordance with the embodiment of the present invention, when the one master CM is connected with the plurality of slave CMs, that I, when the one master CM is connected with the plurality of slave CMs and thus, the CMs are centralized topology, the slave CMs are subjected to the control of the master CM so that the system for managing resources provides the coexistence and the frequency sharing of the slave CMs. In this case, the system for managing resources defines the interface between the CMs as illustrated in FIGS. 14 to 16. In addition, when the plurality of CMs are connected with each other without a predetermined rule, in other words, when the plurality of CMs are a dispersive topology, the system for managing resources controls to provide the coexistence and the frequency sharing between the CMs by cooperating any CM and the neighbor CMs and the system for managing resources defines the interface between the CMs as illustrated in FIGS. 17 and 18.

Then, describing the state of the CM with reference first to FIG. 14, the master CM is switched to an active state 1404 through the initialization process 824 in the inactive state 1402 in the interface definition between the master CM and the slave CM of the system for managing resources. Further, the master CM is switched to the inactive state 1402 through a shutdown 1426 in the active state 1402.

In addition, the master CM sends the connection response as the response of the connection request to the slave CM 1416 and is then switched to the engaged state 1400 when receiving the connection request from the slave CM in the active state 1404.

Further, the master CM is switched to the request received state 1406 when receiving the context information request of the sharing device from the slave CM in the engaged state 1400 (1418) and sends the context information response as the response to the request received to the slave CM (1420) and is switched to the engaged state 1400.

Further, the master CM sends the context information/event information/reconfiguration request of the sharing device to the slave CM in the engaged state 1400 (1422) and is then switched to the request sent state 1408 and receives the context information/event information/reconfiguration response as the response for the request sent from the slave CM (1424) and is switched to the engaged state 1400. In this case, the master CM sends the reconfiguration request to the slave CM according to the coexistence decision of the master CM in the engaged state 1400 (1422) and is switched to the request sent state 1408 and is switched to the engaged state 1400 when receiving the reconfiguration response from the slave CM (1424).

Further, the master CM receives the event response corresponding to the generated event from the slave CM (1412) when the predetermined specific event is generated in the CM by the master CM even though the request of the master CM is absent in the engaged state 1400. In addition, the master CM periodically receives the being-engagement request to the CM from the slave CM in the engaged state 1400 (1410) and maintains the engaged state 1400.

Further, the master CM receives the disconnection request from the slave CM in the engaged state 1400 or fail to periodically receive the being-engagement request from the slave CM in the engaged state 1400 (1414) and is switched to the active state 1404 after the connection with the CE ends.

Then, describing the state of the CM with reference to FIG. 15, the slave CM is switched to the active state 1504 through the initialization process 1542 in the inactive state 1402 in the interface definition between the master CM and the slave CM of the system for managing resources. Further, the slave CM is switched to the inactive state 1502 through a shutdown 1540 in the active state 1504.

In addition, the slave CM is switched to a waiting engaged state 1510 after sending the connection request 1534 to the CM in the active state 1510. Further, the slave CM is switched to the active state 1504 when no receiving the connection response from the CM within the predetermined time in the waiting engaged state 1504 (1535). Meanwhile, the slave CM is switched to the engaged state 1500 when receiving the connection response from the master CM within the predetermined time in the waiting engaged state 1500 (1538).

Further, the slave CM is switched to the request sent state 1508 when sending the context information request of the sharing device to the master CM in the engaged state 1500 (1530) and receives the context information response as the response to the request sent from the master CM (1532) and is switched to the engaged state 1500.

Further, the slave CE is switched to the request received state 1506 when receiving the context information/event information/reconfiguration request of the sharing device from the master CM in the engaged state 1500 and sends the context information, the event information, and the reconfiguration response as the response to the request received to the master CM (1528) and is switched to the engaged state 1500.

Further, the slave CM receives the event response corresponding to the generated event from the master CM (1522)

when the predetermined specific event is generated in the CM by the master CM even though the request of the master CM is absent in the engaged state 1500. In addition, the slave CM periodically sends the being-engagement request to the master CM in the engaged state 1500 (1520) and maintains the engaged state 1500.

Further, the slave CM sends the disconnection request to the master CM in the engaged state 1500 (1524) and is then switched to the active state 1504 after the connection with the master CM ends.

Then, describing the message sending and receiving between the master CM and the slave CM for the interface between the master CM and the slave with reference to FIG. 16, a slave CM 1605 in a disengaged state 1670, for example, the active state sends the connection request message to a master CM 1600 that is the disengaged state 1640, for example, the active state (S1610). In this case, the slave CM 1605 operates timer 1 1672 of the slave CM 1605 for confirming whether the response for the connection request is received from the master CM 1600 within a predetermined time after sending the connection request message and the slave CM 1605 is switched to the waiting engaged state.

Further, the master CM 1600 receives the connection request message from the slave CM 1605 and sends the connection response message as the response for the connection request message to the slave CM 1605 (S1612). In this case, the master CM 1600 sends the connection response message and is switched to an engaged state 1650 in the disengaged state 1640 and the CM 1000 in the engaged state 1650 sets a period for maintaining the engagement and timer 1 1652, timer 2 1654, and timer 3 1656 of the CM 1600 are operated for each period for maintaining the engagement in the engaged state 1654.

In addition, when the slave CM 1605 receives the connection response message from the master 1600 during the operation of the timer 1 1672 of the slave CM 1605, that is, within the predetermined time, the slave CM 1605 is switched from the disengaged state 1670 to the engaged state 1680. In addition, timer 2 1682, timer 3 1684, and timer 4 1686 of the CM 1605 are operated in the engaged state 1686 according to the period for maintaining the engagement set in the master CM 1600.

Here, the slave CM 1605 sends the being-engagement request message to the master CM 1600 when the timer 1 1652 of the CM 16005 and the timer 2 1682 of the slave CM 1605 end according to the period in which the engagement is maintained (S1622) and the slave CM 1605 sends the being-engagement request message to the master CM 1600 when the timer 2 1654 of the master CM 1600 and the timer 3 1684 of the slave CM 1605 end (S1632).

Further, the master CM 1600 in the engaged state 1650 sends the context info.request message for requesting the context information of the sharing device to the slave CM 1605 in the engaged state 1680 (S1614). Then, the slave CM 1605 receives the context info.request message and sends the context info.response message including the context information as the response for the context information request message to the master CM 1600 in the engaged state 1650 (S1616).

Further, the master CM 1605 in the engaged state 1680 sends the context info.request message for requesting the context information of the sharing device to the master CM 1600 in the engaged state 1650 (S1618). Then, the master CM 1600 receives the context info.request message and sends the context info.response message including the context information as the response for the context information request message to the slave CM 1605 in the engaged state 1680 (S1620).

Further, the master CM 1600 in the engaged state 1650 sends the event info.request message for requesting the event information of the sharing device to the slave CM 1605 in the engaged state 1680 (S1624). Then, the slave CM 1605 receives the event information request message and sends the event response message including the event information corresponding to the event generated from the slave CM 1605 as the response for the event information request message to the master CM 1600 in the engaged state 1650 (S1626). Here, the slave CM 1605 in the engaged state 1680 sends the event response message including the event information corresponding to the generated event to the master CM 1600 of the engaged state 1650 when the predetermined event is generated from the slave CM 1605 by the master CM 1600 even though the event information request message is not received from the master CM 1605 (S1634).

Further, the master CM 1600 in the engaged state 1650 sends the reconfiguration request message for resetting, that is, reconfiguring the configuration of the sharing device to the slave CM 1605 in the engaged state 1680 (S1628). Then, the slave CM 1605 receives the reconfiguration request message and reconfigures the configuration of the sharing device as the response for the event information request message and then sends the reconfiguration response message including the information on the reconfiguration to the master CM 1600 of the engaged state 1650 (S1630).

In this case, when the slave CM 1605 in the engaged state 1680 wants to end the connection with the master CM 1600, the slave CM 1605 in the engaged state 1680 sends the disconnection request message to the master CM 1600 in the engaged state 1650 (S1636) and the slave CM 1605 in the engaged state 1680 ends the connection with the master CM 1600 and is switched to the disengaged state 1690, that is, the active state. In addition, the master 1600 in the engaged state 1650 receives the disconnection request message and is switched to the disengaged state 1660, that is, the active state after the connection with the slave 1605 ends.

Next, describing the state of any CM in the dispersive topology with reference first to FIG. 17, the CM is switched to an active state 1704 through an initialization process 1746 in an inactive state 1702 in the interface definition between the CM and the neighbor CM of the system for managing resources. Further, the CM is switched to the inactive state 1702 through a shutdown 1744 in the active state 1704.

In addition, when the CM requests the connection to the neighbor CM, the CM is switched to a waiting engaged state 1710 after sending the connection request 1738 to the neighbor CM in the active state 1704. Further, the CM is switched to the active state 1704 when no receiving the connection response from the neighbor CM within the predetermined time in the waiting engaged state 1710 (1740). Meanwhile, the CM is switched to the engaged state 1710 when receiving the connection response from the neighbor CM within the predetermined time in the waiting engaged state 1710 (1742).

Meanwhile, when the neighbor CM requests the connection to the CM, the CM sends the connection response as the response of the connection request to the neighbor CM and is then switched to the engaged state 1700 when receiving the connection request from the neighbor CM in the active state 1704 (1728).

Further, the CM is switched to the request received state 1706 when receiving the context information/event information of the sharing device from the neighbor CM in the engaged state 1700 and sends the context information/event response as the response to the request received to the neighbor CM (1732) and is switched to the engaged state 1700. Further, the CM receives the event response corresponding to the generated event from the neighbor CM (1722) when the predetermined specific event is generated in the neighbor CM by the CM even though the request of the CM is absent in the engaged state 1700.

Further, the CM sends the context information/event information request of the sharing device to the CM in the engaged state 1700 to the neighbor CM (1734) and is then switched to the request sent state 1708 and receives the context information/event response as the response for the request sent from the neighbor CM (1736) and is switched to the engaged state 1700. Further, the CM sends the event response corresponding to the generated event to the neighbor CM (1724) when the predetermined specific event is generated in the CM by the neighbor CM even though the request of the CM is absent in the engaged state 1700. In addition, the CM periodically sends and receives the being-engagement request to and from the neighbor CM in the engaged state 1700 (1720) and maintains the engaged state 1700.

Further, when the CM sends and receives the disconnection request to and from the neighbor CM in the engaged state 1700 or fail to periodically receive the being-engagement request from the neighbor CM in the engaged state 1700 (1726) by requesting the connection of the CM, the CM is switched to the active state 1704 after the connection with the CE ends.

As described above, when the CM requests the connection, the CM periodically the being-engagement request to the neighbor CM in the engaged state 1700 (1720) and maintains the engagement state 1700 and sends the disconnection request to the neighbor CM in the engaged state 1700 (1726) and is switched to the active state 1704 after the connection with the master CM ends. Further, when the connection with the neighbor CM is requested, the CM periodically receives the being-engagement request from the neighbor CM in the engaged state 1700 (1720) to maintain the engagement state 1700 and when the CM receives the disconnection request or failing to receiving the being-engagement request from the neighbor CM in the engaged state 1700 (1726), the CM is switched to the active state 1704 after the connection with the slave CM ends.

Then, describing the message sending and receiving between the CM and the neighbor CM for the interface between any CM and the neighbor CM with reference to FIG. 18, a neighbor CM 1605 in a disengaged state 1870, for example, the active state sends the connection request message to the CM 1800 that is the disengaged state 1840, for example, the active state (S1810). As described above, in the interface definition between any CM and the neighbor CM, there are the case in which the CM requests the connection and the case in which the neighbor CM requests the connection but the detailed description thereof is described in detail in FIG. 17 and therefore, the case in which the CM requests the connection will be mainly described for convenience of explanation herein.

Further, the neighbor CM 1805 sending the connection request message to the CM 1800 operates the timer 1 1872 of the neighbor CM 1805 for confirming whether the response for the connection request is received from the CM 1800 within a predetermined time after sending the connection request message and the neighbor CM 1805 is switched to the waiting engaged state.

Further, the CM 1800 receives the connection request message from the neighbor CM 1805 and sends the connection response message as the response for the connection request message to the neighbor CM 1805 (S1812). In this case, the CM 1800 sends the connection response message and is switched to an engaged state 1850 in the disengaged state 1840 and the CM 1800 in the engaged state 1850 sets a period for maintaining the engagement and the timer 1 1852, the timer 2 1854, and the timer 3 1856 of the CM 1800 are operated for each period for maintaining the engagement in the engaged state 1850.

In addition, when the neighbor CM 1805 receives the connection response message from the CM 1800 during the operation of the timer 1 1872 of the neighbor CM 1805, that is, within the predetermined time, the neighbor CM 1805 is switched from the disengaged state 1870 to the engaged state 1880. In addition, the timer 2 1882, the timer 3 1884, and the timer 4 1886 of the CM 1805 are operated in the engaged state 1880 according to the period for maintaining the engagement set in the CM 1800.

Here, the neighbor CM 1805 sends the being-engagement request message to the CM 1800 when the timer 1 1852 of the CM 1800 and the timer 2 1882 of the neighbor CM 1805 end according to the period in which the engagement is maintained (S1822) and the neighbor CM 1805 sends the being-engagement request message to the CM 1800 when the timer 2 1854 of the CM 1800 and the timer 3 1884 of the neighbor CM 1805 end (S1828).

Further, the neighbor CM 1805 in the engaged state 1880 sends the context info.request message for requesting the context information of the sharing device to the CM 1800 in the engaged state 1850 (S1814). Then, the CM 1800 receives the context info.request message and sends the context info.response message including the context information as the response for the context information request message to the neighbor CM 1805 in the engaged state 1880 (S1816).

Further, the CM 1800 in the engaged state 1850 sends the context info.request message for requesting the context information of the sharing device to the neighbor CM 1805 in the engaged state 1850 (S1818). Then, the neighbor CM 1805 receives the context info.request message and sends the context info.response message including the context information as the response for the context information request message to the CM 1800 in the engaged state 1850 (S1820).

Further, the master CM 1800 in the engaged state 1850 sends the event info.request message for requesting the event information of the sharing device to the neighbor CM 1805 in the engaged state 1880 (S1824). Then, the neighbor CM 1805 receives the event information request message and sends the event response message including the event information corresponding to the event generated from the neighbor CM 1805 as the response for the event information request message to the CM 1800 in the engaged state 1850 (S1826). Here, the neighbor CM 1805 in the engaged state 1880 sends the event response message including the event information corresponding to the generated event to the CM 1800 of the engaged state 1850 when the predetermined event is generated from the neighbor CM 1805 by the CM 1800 even though the event information request message is not received from the CM 1800 (S1830).

In this case, when the neighbor CM 1805 in the engaged state 1880 wants to end the connection with the CM 1800, the neighbor CM 1805 in the engaged state 1880 sends the disconnection request message to the CM 1800 in the engaged state 1850 (S1832) and then, the neighbor CM 1805 in the engaged state 1880 ends the connection with the master CM 1800 and is switched to the disengaged state 1890, that is, the active state. In addition, the CM 1800 in the engaged state 1850 receives the disconnection request message and is then switched to the disengaged state 1860, that is, the active state after the connection the slave CM ends.

The system for managing resources in the communication system in accordance with the embodiment of the present invention allows the plurality of systems to detect the available frequency bands in the frequency bands used in advance by the primary system like the TV band, defines the interface for the coexistence and the frequency sharing of the plurality of systems in the available frequency bands as described above, that is, defines the interface among the CEs, the CMs, and the CDIS, respectively, and sends and receives the context information, the event information, and the reconfiguration related information of the plurality of systems through the sending and receiving according to the interface, such that the plurality of systems shares the available frequency bands through the coexistence and the frequency sharing.

In accordance with the embodiments of the present invention, the plurality of systems coexist in the communication system according to the reference models to manage the frequency resources so as to use the available frequency bands among the frequency bands used in advance like a TV band, thereby more effectively using the limited frequency resources to improve the using efficiency of the frequency resources.

Further, the embodiments of the present invention can define the interfaces for the coexistence and the frequency sharing of the plurality of systems in the communication system and send and receive the signals according to the defined interfaces to manage th frequency resources so as to use the available frequency band among the frequency bands used in advance like the TV band through the coexistence and the frequency sharing of the plurality of systems, thereby more effectively using the limited frequency resources to improve the using efficiency of the frequency resources.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of sharing devices, the sharing devices not having permission for a first frequency band, the system for managing resources comprising:
 a coexistence manager (CM) communicatively coupled to the sharing devices and configured to manage the sharing devices for providing coexistence and frequency sharing of the sharing devices in the available frequency bands when the sharing devices search the available frequency bands within the first frequency band;
 a coexistence enabler (CE) communicatively coupled to the CM, the CE configured to send and receive information on the sharing devices and send and receive information on the CM; and
 a coexistence discovery and information server (CDIS) communicatively coupled to the CM, the CDIS configured to support a control of the CM for the sharing devices,
 wherein the sharing devices use the available frequency bands through the coexistence and the frequency sharing according to a reference model.

2. The system for managing resources of claim 1, wherein a first sharing device of the sharing devices uses one available channel as an operating channel in the available frequency bands by an individual channel assignment scheme according to the reference model.

3. The system for managing resources of claim 1, wherein the sharing devices share and use the one available channel as the operating channel in the available frequency bands through a co-channel sharing scheme according to the reference model.

4. The system for managing resources of claim 3, wherein the sharing devices are grouped into a first group to form a first communication scheme and the sharing devices are grouped into a second group to form a second communication scheme, and
 the sharing devices of the first group share and use the first available channel as the operating channel in the available frequency bands and the sharing devices of the second group share and use the second available channel as the operating channel in the available frequency bands.

5. The system for managing resources of claim 3, wherein the sharing devices defined by a first interface in the sharing devices are grouped into the first group and the sharing devices defined by a second interface are grouped into the second group, and
 the sharing devices of the first group share and use the first available channel as the operating channel in the available frequency bands and the sharing devices of the second group share and use the second available channel as the operating channel in the available frequency bands.

6. The system for managing resources of claim 1, wherein the system for managing resources defines the reference model and the interface for the coexistence manager, the coexistence enabler, and the coexistence discovery and information server, respectively, and in the each of the reference models, the coexistence manager, the coexistence enabler, and the coexistence discovery and information server includes a service access point (SAP).

7. The system for managing resources of claim 6, wherein in the each of the reference models, the coexistence manager, the coexistence enabler, and the coexistence discovery and information server includes a CoeXistence NETwork SAP (CX_NET_SAP) and
 in the reference model of the coexistence enable, the coexistence enable further includes a CoeXistence Device Management Entity SAP (CX_DME_SAP).

8. The system for managing resources of claim 7, wherein the CoeXistence Device Management Entity SAP includes CoeXistence Primitive Mapping (CXPM) entity that matches a primitive or management information base with the CX_DME _SAP primitive at the time of performing communication with CoeXistence Device Management Entity SAP using a communication scheme different from the CoeXistence Device Management Entity SAP.

9. The system for managing resources of claim 8, wherein the CX_ DME _SAP primitive includes a Context.Info.Get primitive, a Reconfiguration.Set primitive, an Event.Set primitive, and an Event.Get primitive.

10. The system for managing resources of claim 9, wherein the coexistence manager and the coexistence enabler sends the request message including the Context.Info.Get primitive and the Reconfiguration.Set primitive according to the reference model to the sharing devices through the interface and receives a confirmation message including the context information of the sharing devices as the response of the request message.

11. The system for managing resources of claim 10, wherein the coexistence manager and the coexistence enabler sends the request message including the Event.Set primitive and the Event.Get primitive to the sharing devices through the interface according to the reference model and receives the confirmation message including the event information of the sharing devices as the response of the request message.

12. The system for managing resources of claim 7, wherein the CoeXistence NETwork SAP performs the communication with remote entity and database entity through an L2 transport and an L3 transport, the remote entity and the data base entity include the CoeXistence NETwork SAP, and the CoeXistence NETwork SAP performs communication with the remote entity and the database entity of the same communication scheme as the CoeXistence NETwork SAP through the L2 transport and performs communication with the remote entity and the database entity of a communication scheme different from the CoeXistence NETwork SAP through the L3 transport.

13. The system for managing resources of claim 6, wherein the coexistence manager, the coexistence enabler, the coexistence discovery and information server, the master coexistence manager, the slave coexistence manager, the first coexistence manager, and the neighbor coexistence manger send and receive the request message requesting the context information, the event information, and the reconfiguration related information and a response message including the context information, the event information, and the reconfiguration related information.

14. The system for managing resources of claim 1, wherein the coexistence manager determines operation frequency allocation, transmission power allocation, and transmission time allocation of the sharing devices in the available frequency bands and receives the context information and the event information of the sharing devices.

15. The system for managing resources of claim 14, wherein the coexistence enabler sends the context information and the event information of the sharing devices to the coexistence manager in the available frequency bands, and the context information of the sharing devices includes information on a wireless access scheme, transmission power, a spectrum sensing threshold value, and a position of the sharing devices.

16. The system for managing resources of claim 1, wherein the information on the sharing devices includes the context information, the event information, and the reconfiguration related information, and the context information, the event information, and the reconfiguration related information are sent and received among the coexistence manager, the coexistence enabler, and the coexistence discovery and information server according to the interface defined among the coexistence manager, the coexistence enabler, and the coexistence discovery and information server.

17. The system for managing resources of claim 16, wherein the interface is defined between a master coexistence manager and a slave coexistence manager of the coexistence managers and between a first coexistence manager and a neighbor coexistence manager of the coexistence mangers, respectively, that are included corresponding to each of the sharing devices between the coexistence manager and the coexistence enabler and between the coexistence manager and the coexistence discovery and information server.

18. A method for managing resources in a first frequency band in a communication system including a plurality of sharing devices not having permission for a first frequency band, the method for managing resources comprising:

defining, at least one reference model and at least one interface in an available frequency band for providing coexistence and frequency sharing of the sharing devices in the available frequency bands when the sharing devices search for the available frequency bands in the first frequency band;

grouping the sharing devices according to a communication scheme and an interface of the sharing devices; and allocating a first available channel in the available frequency bands as an operating channel of a first group of the sharing devices according to the reference model.

19. The method for managing resources of claim 18, wherein the reference model is defined by a coexistence manager (CM), a coexistence enabler (CE), and a coexistence discovery and information server (CDIS), respectively, for providing the coexistence and the frequency sharing of the sharing devices in the available frequency bands.

20. The method for managing resources of claim 19, wherein the information on the sharing devices includes context information, event information, and reconfiguration related information, and the context information, the event information, and the reconfiguration related information are sent and received among the coexistence manager, the coexistence enabler, and the coexistence discover and information server according to the interface defined among the coexistence manager, the coexistence enabler, and the coexistence discovery and information server.

\* \* \* \* \*